(12) United States Patent  
Yokouchi

(10) Patent No.: US 7,187,147 B2
(45) Date of Patent: Mar. 6, 2007

(54) MOTOR DRIVE

(75) Inventor: Tomoharu Yokouchi, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 133 days.

(21) Appl. No.: 10/924,939

(22) Filed: Aug. 25, 2004

(65) Prior Publication Data
US 2005/0047185 A1 Mar. 3, 2005

(30) Foreign Application Priority Data
Aug. 27, 2003 (JP) ............................. 2003-302223
Jul. 30, 2004 (JP) ............................. 2004-222659

(51) Int. Cl.
H02P 5/41 (2006.01)

(52) U.S. Cl. ....................... 318/432; 318/599; 318/811

(58) Field of Classification Search ................ 318/432, 318/433, 439, 807, 811, 599, 282, 283; 363/40, 363/41, 48, 127, 132
See application file for complete search history.

(56) References Cited
U.S. PATENT DOCUMENTS
5,309,078 A 5/1994 Cameron .................... 318/811
5,498,947 A * 3/1996 Wang et al. ................. 318/811
5,581,452 A * 12/1996 Yamamoto .................... 363/41
6,194,856 B1* 2/2001 Kobayashi et al. ......... 318/432

FOREIGN PATENT DOCUMENTS
JP 5-211780 8/1993

* cited by examiner

Primary Examiner—Jessica Han
(74) Attorney, Agent, or Firm—Steptoe & Johnson LLP

(57) ABSTRACT

A current detecting switching element is connected to an output circuit having switching elements making a bridge connection, current flowing to the switching element is detected by a current detection circuit in response to a torque command signal, a PWM signal generation circuit generates a PWM signal according to the output, a synthesizing circuit synthesizes the output of a power switch circuit for determining an energized phase to a motor coil and the output signal of the PWM signal generation circuit, and PWM operation of a first state and a second state is repeated to control current supply to the motor coil. The first state enables current supply to the motor coil when the switching element on one side is conducting, the switching element on the other side is nonconducting, and the current detecting switching element is conducting. The second state brings the current detecting switching element out of conduction and brings into conduction all the switching elements making a bridge connection in an energizing polarity switch circuit.

3 Claims, 19 Drawing Sheets

F I G. 1
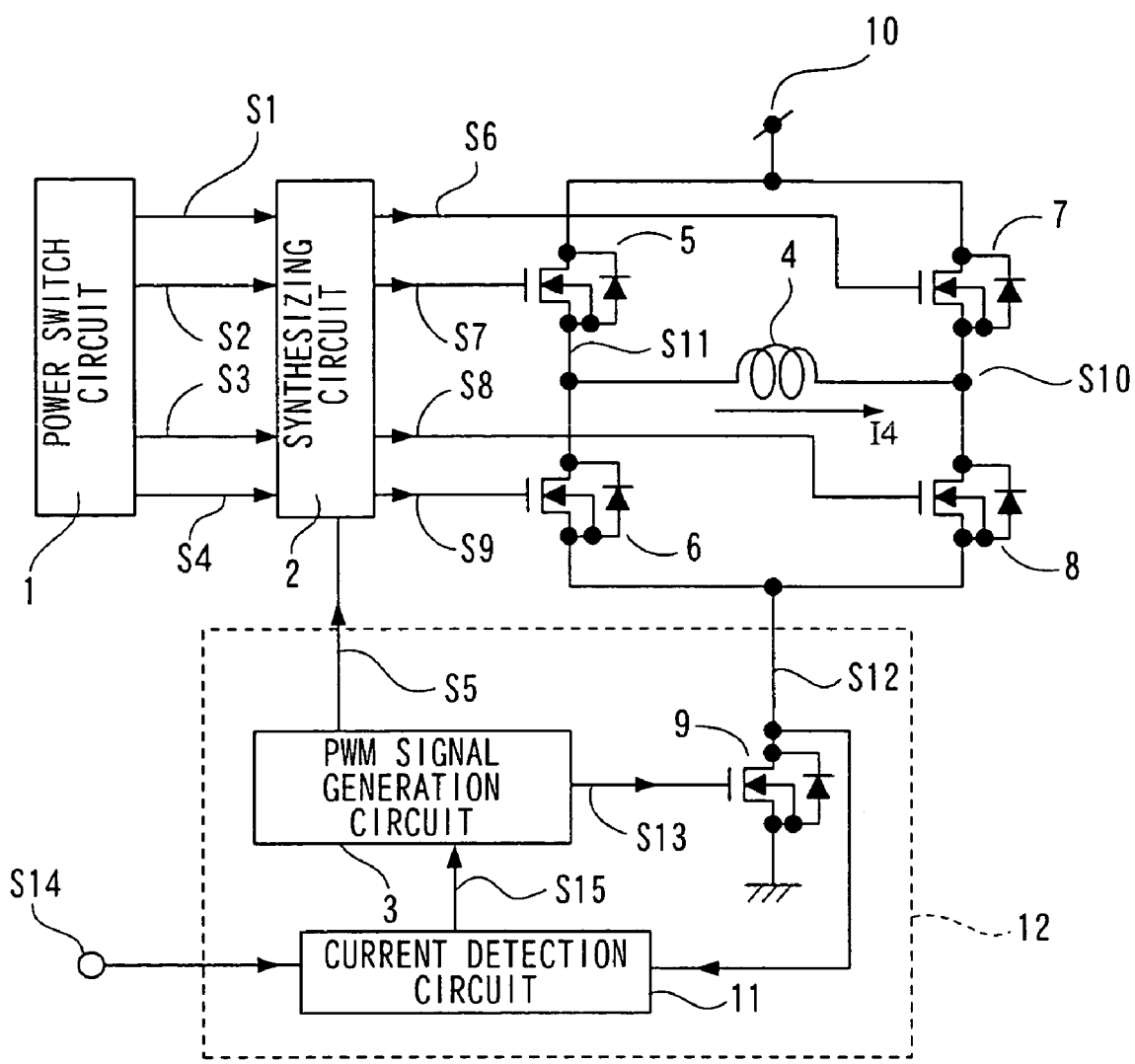

F I G. 1 2
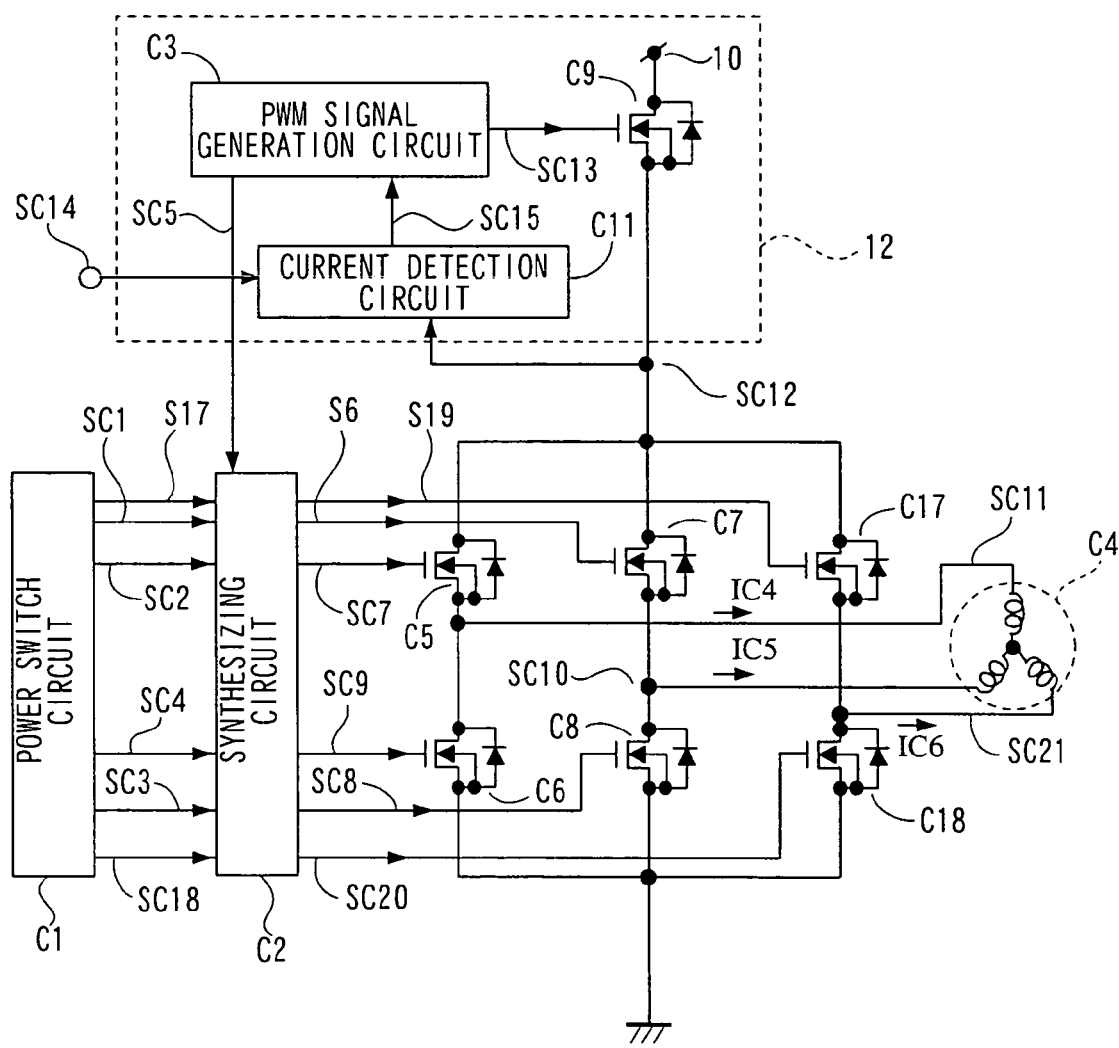

MOTOR DRIVE

FIELD OF THE INVENTION

The present invention relates to a motor driving technique and particularly relates to a motor driving technique of PWM (pulse width modulation) system.

BACKGROUND OF THE INVENTION

A PWM motor drive using synchronous rectification is disclosed in Japanese Patent Laid-Open No. 5-211780 and so on.

FIG. 15 shows a conventional single-phase motor drive. Reference numeral 1 denotes a power switch circuit, reference numeral 2 denotes a synthesizing circuit, reference numeral 3 denotes a PWM signal generation circuit, and reference numeral 4 denotes a single-phase motor coil. An output circuit for driving the single-phase motor coil 4 by PWM chopping makes a bridge connection of switching elements 5, 6, 7, and 8. The ends of the switching elements 5, 6, 7, and 8 that make a bridge connection are connected to a pole 10 of a power supply and the other ends of the switching elements are grounded to the other pole of the power supply via a current detection resistor 15 serving as a current detector. The single-phase motor coil 4 is connected on a midpoint of the switching elements 5, 6, 7, and 8 that make a bridge connection. In the following explanation, the switching elements 5 and 7 will be referred to as upper arm transistors and the switching elements 6 and 8 will be referred to as lower arm transistors.

The following will discuss operations of the single-phase motor drive shown in FIG. 15.

First an energization phase is determined by the power switch circuit 1. When the upper arm transistors 5 and the lower arm transistors 8 are conducting, current applied to the coil 4 flows to the current detection resistor 15. When the current reaches the coil current corresponding to a torque command voltage S14, the current is detected by a current detection circuit 11. The current detection circuit 11 changes its output and the output is inputted to the PWM signal generation circuit 3.

The output signal of the PWM signal generation circuit 3 is synthesized with the output signal of the power switch circuit 1 in the synthesizing circuit 2. When a transistor on the PWM driving side is driven by the lower arm, the lower arm transistor 8 is nonconducting and the upper arm transistor 7 is conducting. At this point, a current I4 applied to the coil 4 keeps flowing to the upper arm transistors 5 and 7 but gradually decreases. At a given moment, the upper arm transistor 7 is made nonconducting and the lower arm transistor 8 is made conducting again by the output of the PWM signal generation circuit 3 and a coil current is increased. PWM operation is performed by repeating these operations.

FIG. 16 is a timing chart of output signals and a motor current driven by the single-phase motor drive shown in FIG. 15. FIG. 16 shows output signals S1 to S4 of the power switch circuit 1, signals S6 to S9 which are the output signals of the synthesizing circuit 2 and the gate input signals of the upper arm transistors and the lower arm transistors, a voltage S12 generated in the current detection resistor 15, the torque command voltage S14, an output signal S15 of the current detection circuit 11, an output S5 of the PWM signal generation circuit 3, and the current I4 applied to the motor coil 4. In FIG. 15, the outputs S1 to S4 of the power switch circuit 1 output the signals S6 to S9 for bringing the upper arm transistor 5 and the lower arm transistor 8 into conduction and the signals S6 to S9 are inputted to the synthesizing circuit 2. In this state, S5 is outputted from the PWM signal generation circuit 3 at given moment t1 and is inputted to the synthesizing circuit 2, the signals S6 to S9 are outputted from the synthesizing circuit 2, the upper arm transistor 5 and the lower arm transistor 8 are made conducting, the coil current I4 gradually increases, and the voltage S12 generated in the current detection resistor 15 also increases. When the voltage S12 generated in the current detection resistor 15 reaches at moment t2 the voltage S14 determined by a torque command signal, the output S15 of the current detection circuit 11 is changed and is inputted to the PWM signal generation circuit 3, the output signal S5 of the PWM signal generation circuit 3 is inputted to the synthesizing circuit 2 to have a regenerative state, and the synthesizing circuit 2 outputs S6 to S9, so that the lower arm transistor 8 is made nonconducting and the upper arm transistor 7 is made conducting.

At moments t2 and t3, the upper arm transistors 5 and 7 are conducting and the current I4 of the coil 4 becomes a regenerative current and gradually decreases. At moment t3, S5 is outputted again from the PWM signal generation circuit with arbitrary timing and the signals S6 to S9 are outputted from the synthesizing circuit 2, the upper arm transistor 5 and the lower arm transistor 8 are made conducting, the coil current I4 gradually increases, and the voltage S12 generated in the current detection resistor 15 also increases. By repeating this operation, it is possible to apply the current I4 almost equivalent to the torque command voltage S14 to the motor coil 4.

FIG. 17 shows a conventional three-phase motor drive. Reference numeral C1 denotes a power switch circuit, reference numeral C2 denotes a synthesizing circuit, reference numeral C3 denotes a PWM signal generation circuit, reference numeral C4 denotes a three-phase motor coil, reference numerals C5, C7, and C17 denote upper arm transistors, reference numerals C6, C8, and C18 denote lower arm transistors, reference numeral 10 denotes a power supply, reference numeral C11 denotes a current detection circuit, and reference numeral C15 denotes a current detection resistor.

The following will discuss operations of the three-phase motor drive shown in FIG. 17.

First an energization phase is determined by the power switch circuit C1. When the upper arm transistors C5 and the lower arm transistors C8 are conducting and the upper arm transistors C7 and C17 and the lower arm transistors C6 and C18 are nonconducting, current applied to the motor coil C4 flows to the current detection resistor C15. When the current reaches a coil current corresponding to a torque command voltage SC14, the current is detected by the current detection circuit C11. The current detection circuit C11 changes its output and the output is inputted to the PWM signal generation circuit C3. The output signal of the PWM signal generation circuit C3 is synthesized with the output signal of the power switch circuit C1 in the synthesizing circuit C2. When a transistor on the PWM driving side is driven by the lower arm, the lower arm transistor C8 is nonconducting and the upper arm transistor C7 is conducting. At this point, currents IC4 and IC5 applied to the motor coil C4 keep flowing to the upper arm transistors C5 and C7 but gradually decrease. At a given moment, the upper arm transistor C7 is made nonconducting and the lower arm transistor C8 is made conducting again by the output of the PWM signal generation circuit C3 and a coil current is increased. PWM operation is performed by repeating these operations.

FIGS. 18 and 19 are time charts of output signals and a motor current driven by the three-phase motor drive of FIG. 17. FIG. 18 is an overall view and FIG. 19 is an enlarged view of period T1 shown in FIG. 18. FIGS. 18 and 19 show output signals SC1 to SC4, SC17, and SC18 of the power switch circuit C1, signals SC6 to SC9, SC19, and SC20 which are the output signals of the synthesizing circuit C2 and the gate input signals of the upper arm transistors and the lower arm transistors, a voltage SC12 generated in the current detection resistor C15, a torque command voltage SC14, an output signal SC15 of the current detection circuit C11, an output signal SC5 of the PWM signal generation circuit C3, and currents IC4 to IC6 applied to the motor coil C4. In FIG. 17, the outputs SC1 to SC4, SC17, and SC18 of the power switch circuit C1 output the signals SC6 to SC9, SC19, and SC20 for bringing the upper arm transistor C5 and the lower arm transistor C8 into conduction and the signals are inputted to the synthesizing circuit C2. In this state, SC5 is outputted from the PWM signal generation circuit C3 at given moment tc1 and is inputted to the synthesizing circuit C2, the signals SC6 to SC9, SC19, and SC20 are outputted from the synthesizing circuit C2, the upper arm transistor C5 and the lower arm transistor C8 are made conducting, the coil currents IC4 and IC5 gradually increase, and the voltage SC12 generated in the current detection resistor C15 also increases. When the voltage SC12 generated in the current detection resistor C15 reaches at moment tc2 the voltage SC14 determined by a torque command signal, the output SC15 of the current detection circuit C11 is changed and is inputted to the PWM signal generation circuit C3, the output signal SC5 of the PWM signal generation circuit C3 is inputted to the synthesizing circuit C2 to have a regenerative state, and the synthesizing circuit C2 outputs SC6 to SC9, SC19, and SC20, so that the lower arm transistor C8 is made nonconducting and the upper arm transistor C7 is made conducting.

At moments tc2 and tc3, the upper arm transistors C5 and C7 are conducting and the currents IC4 and IC5 of the motor coil C4 become regenerative currents and gradually decrease. At moment tc3, SC5 is outputted again from the PWM signal generation circuit with arbitrary timing and the signals SC6 to SC9, SC19, and SC20 are outputted from the synthesizing circuit C2, the upper arm transistor C5 and the lower arm transistor C8 are made conducting, the coil currents IC4 and IC5 gradually increase, and the voltage SC12 generated in the current detection resistor C15 also increases. By repeating this operation, it is possible to apply the current IC4 almost equivalent to the torque command voltage SC14 to the motor coil C4. In FIG. 18, the operation of FIG. 19 is performed in an energized state determined by the outputs of SC1 to SC4, SC17, and SC18 of the power switch circuit.

However, the conventional configuration regenerates the motor coil current while the two transistors are made conducting, resulting in large power consumption.

Further, the conventional configuration requires a current detection resistor for detecting a large motor coil current. Due to large power consumption, it is difficult to integrate the current detection resistor into an integrated circuit, resulting in a large apparatus with a high cost.

The present invention is devised to solve the conventional problem and has as its object the provision of a motor drive which can integrate a current detection resistor into an integrated circuit and can reduce power consumption during regeneration.

DISCLOSURE OF THE INVENTION

A motor drive of the present invention, in which a power supply voltage is applied across an output circuit having switching elements making a bridge connection, a motor coil is connected on a midpoint of the output circuit, and energization to the motor coil is switched by turning on/off a pair of the switching elements on opposite sides of the bridge connection, the motor drive comprising: a current detecting switching element connected in series with the output circuit, a current detection circuit for detecting, in response to a torque command signal, a current applied to the current detecting switching element, a PWM signal generation circuit for generating a PWM signal according to the output signal of the current detection circuit, a power switch circuit for determining an energization phase to the motor coil, and a synthesizing circuit for synthesizing the output signal of the PWM signal generation circuit and the output signal of the power switch circuit, wherein PWM operation of a first state and a second state is repeated to control current supply to the motor coil, the first state enabling current supply to the motor coil when the switching elements making a bridge connection are such that the switching element on one side determined by the power switch circuit is conducting, the switching element on the other side is nonconducting, and the current detecting switching element is conducting, the second state bringing the current detecting switching element out of conduction and bringing into conduction all the switching elements making a bridge connection in the output circuit.

With this configuration, a current detector can be integrated into an integrated circuit. Further, all the switching elements in the output circuit are made conducting during regeneration of motor coil current, thereby reducing power consumption.

Moreover, in the motor drive of the present invention, the current detection circuit comprises a current detecting reference switching element having the gate and source connected respectively to the gate and source of the current detecting switching element, a comparator for comparing a drain voltage of the current detecting switching element and a drain voltage of the current detecting reference switching element, and a voltage/current converter for converting an inputted torque command signal into current and determining a current inputted to the drain of the current detecting reference switching element, the PWM signal generation circuit generating a PWM signal according to the output signal of the comparator.

Further, in the motor drive of the present invention, the current detection circuit comprises a current detecting reference switching element having the gate and drain connected respectively to the gate and drain of the current detecting switching element, a comparator for comparing a source voltage of the current detecting switching element and a source voltage of the current detecting reference switching element, and a voltage/current converter for converting an inputted torque command signal into current and determining a current inputted to the source of the current detecting reference switching element, the PWM signal generation circuit generating a PWM signal according to the output signal of the comparator.

With these configurations of the current detection circuit, it is possible to reduce variations in detected current value and temperature characteristics for the torque command signal.

According to the motor drive of the present invention, a current detector susceptible to variations and temperature characteristics can be integrated into an integrated circuit, thereby reducing the size of an apparatus. PWM driving on the current detecting transistor can considerably reduce power consumption during regeneration of the motor coil as compared with the conventional art.

BRIEF DESCRIPTION OF THE DRAWINGS

FIG. 1 is a block diagram showing a single-phase motor drive according to (Embodiment 1) of the present invention;

FIG. 12 is a block diagram showing a three-phase motor drive according to (Embodiment 6) of the present invention;

DESCRIPTION OG THE EMBODIMENTS

Referring to FIGS. 1 to 14, a motor drive of the present invention will be described below.

Embodiment 1

Figure 2:
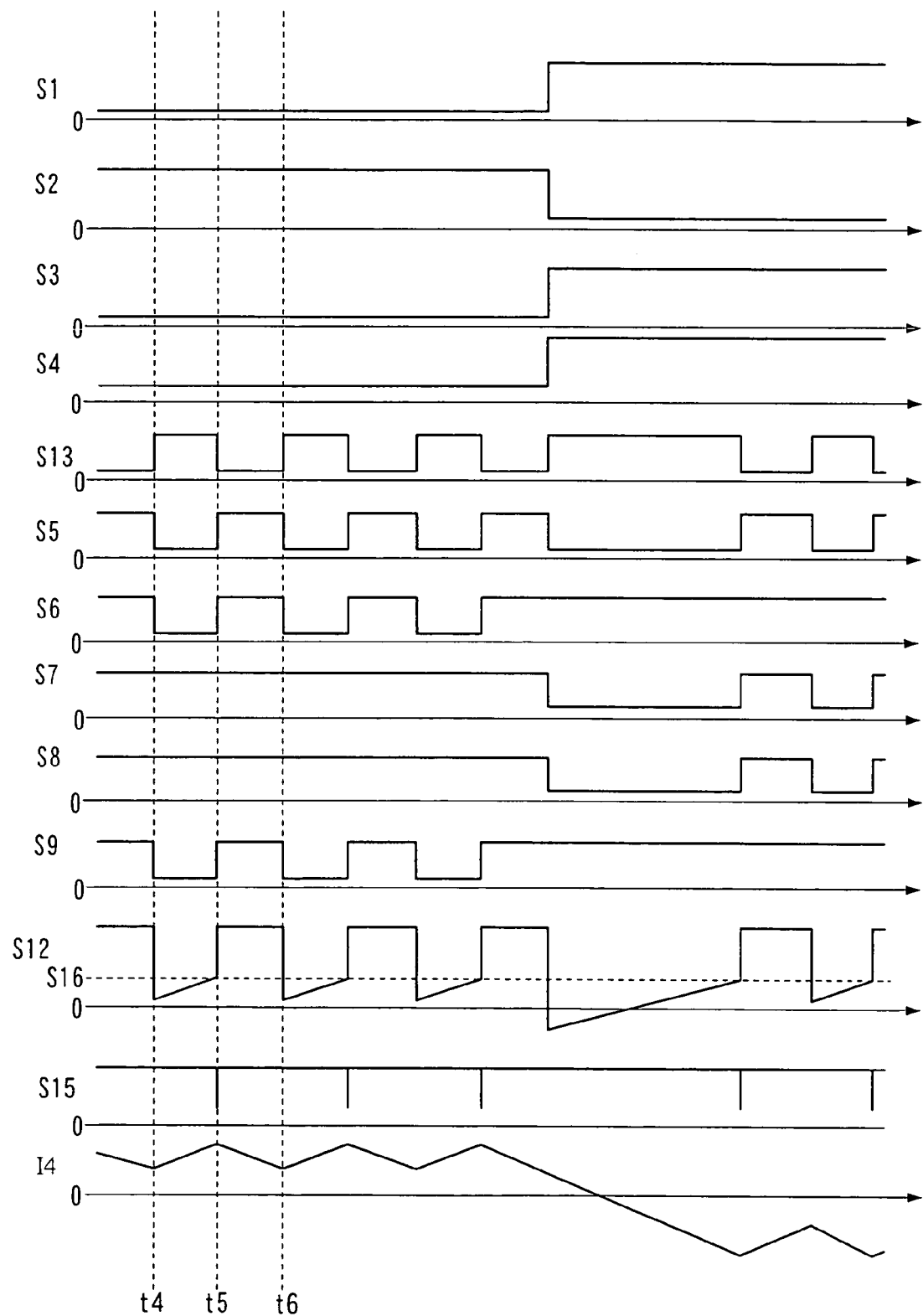
FIG. 2 is a time chart of the embodiment.
Figure 3:
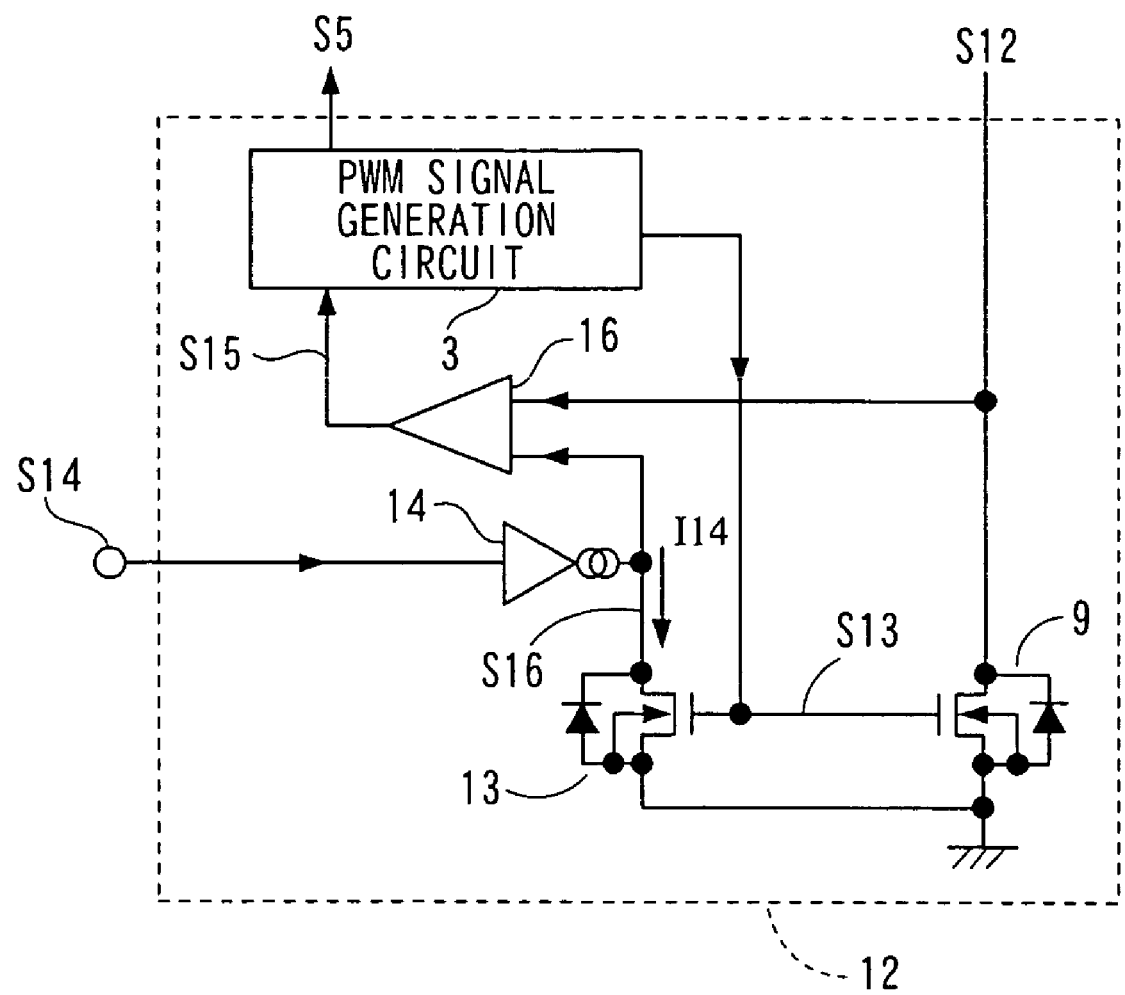
FIG. 3 is a block diagram showing a PWM signal generator, a current detection circuit, and a current detecting transistor of the embodiment.

FIGS. 1 to 3 show (Embodiment 1) of the present invention.

A single-phase motor drive of FIG. 1 comprises upper arm transistors 5 and 7, lower arm transistors 6 and 8, a current detecting transistor 9, a power switch circuit 1, a synthesizing circuit 2, a PWM signal generation circuit 3, a current detection circuit 11, and a motor coil 4. The upper and lower arm transistors 5 to 8 and the current detecting transistor 9 are n-type MOS (metal oxide semiconductor) transistors, each having the source and the drain connected respectively to the anode and the cathode of a diode. The drains of the upper arm transistors 5 and 7 are connected to a pole 10 of a power supply and the sources of the lower arm transistors 6 and 8 are connected to the drain of the current detecting transistor 9. The source of the current detecting transistor is grounded. The upper and lower arm transistors 5 to 8 and the current detecting transistor 9 act as switching elements.

The source of the upper arm transistor 5, the drain of the lower arm transistor 6, and one end of the motor coil 4 are connected to one another, and the source of the upper arm transistor 7, the drain of the lower arm transistor 8, and the other end of the motor coil 4 are connected to one another. The power switch circuit 1 outputs S1 to S4, which are inputted to the synthesizing circuit 2. A drain voltage S12 of the current detecting transistor 9 and a torque command voltage S14 are inputted to the current detection circuit 11, a motor driving current is applied to the current detecting transistor 9, and a voltage corresponding to the torque command voltage S14 is generated on the drain of the current detecting transistor 9. At this point, an output S15 of the current detection circuit 11 changes its state. The output S15 of the current detection circuit 11 is inputted to the PWM signal generation circuit 3. One output of the PWM signal generation circuit 3 generates a switching control signal S13 for specifying a period during which the current detecting transistor 9 is made conducting, and the other output S5 of the PWM signal generation circuit 3 is inputted to the synthesizing circuit 2 and is synthesized therein with the outputs S1 to S4 of the power switch circuit 1. The synthesizing circuit 2 outputs switching control signals S6 to S9 for specifying a period during which the upper and lower arm transistors 5 to 8 are made conducting.

FIG. 2 is a time chart of output signals and motor currents driven by the single-phase motor drive shown in FIG. 1. FIG. 2 shows the output signals S1 to S4 of the power switch circuit 1, signals S6 to S9 which are the output signals of the synthesizing circuit 2 and the gate input signals of the upper arm transistors and the lower arm transistors, the voltage S12 generated on the drain of the current detecting transistor 9, the torque command voltage S14, the output signal S15 of the current detection circuit 11, the output signal S5 of the PWM signal generation circuit 3, and a current I4 applied to the motor coil 4.

In FIG. 1, the outputs S1 to S4 of the power switch circuit 1 output the signals S6 to S9 for bringing the upper arm transistor 5 and the lower arm transistor 8 into conduction and the signals S6 to S9 are inputted to the synthesizing circuit 2. In this state, the output S5 is first outputted from the PWM signal generation circuit 3 at given moment t4 and is inputted to the synthesizing circuit 2, the signals S6 to S9 are outputted from the synthesizing circuit 2, the upper arm transistor 5 and the lower arm transistor 8 are made conducting, and the other output S13 of the PWM signal generation circuit 3 brings the current detecting transistor 9 into conduction. From moment t4, the coil current I4 gradually increases and the voltage S12 generated on the drain of the current detecting transistor 9 also increases. When the voltage S12 generated on the drain of the current detecting transistor 9 reaches at moment t5 the voltage S14 determined by a torque command signal, the output S15 of the current detection circuit 11 is changed and is inputted to the PWM signal generation circuit 3, the output signal S5 of the PWM signal generation circuit 3 is inputted to the synthesizing circuit 2 to have a regenerative state, and the synthesizing circuit 2 outputs S6 to S9, so that the upper arm transistors 5 and 7 and the lower arm transistors 6 and 8 are made conducting. The other output signal S13 of the PWM signal generation circuit 3 brings the current detecting transistor 9 out of conduction.

At moments t5 and t6, the upper arm transistors 5 and 7 and the lower arm transistors 6 and 8 are conducting, the current detecting transistor 9 is nonconducting, and the current I4 of the coil 4 becomes a regenerative current and gradually decreases. At moment t6, S5 is outputted again from the PWM signal generation circuit and inputted to the synthesizing circuit 2 with arbitrary timing, the signals S6 to S9 are outputted from the synthesizing circuit 2, the upper arm transistor 5 and the lower arm transistor 8 are made conducting, the upper arm transistor 7 and the lower arm transistor 6 are made nonconducting, and the other output signal S13 of the PWM signal generation circuit 3 brings the current detecting transistor 9 into conduction, so that the coil current I4 gradually increases again and the voltage S12 generated on the drain of the current detecting transistor 9 also increases. By repeating this operation, it is possible to apply the current I4 almost equivalent to the torque command voltage S14 to the motor coil 4.

FIG. 3 shows a block 12 of the PWM signal generation circuit 3, the current detection circuit 11, and the current detecting transistor 9. The block 12 comprises the current detecting transistor 9, a current detecting reference transistor 13, a voltage/current converter 14, a comparator 16, and the PWM signal generation circuit 3. The current detecting reference transistor 13 is equal in channel length to the current detecting transistor 9 and is sufficiently small in channel width. When the current detecting transistor 9 has a channel width of W9 and the current detecting reference transistor 13 has a channel width of W13, a ratio of W13/W9 is obtained. The gate and source of the current detecting transistor 9 are connected respectively to the gate and source of the current detecting reference transistor 13, and the drain S12 of the current detecting transistor 9 and a drain S16 of the current detecting reference transistor 13 are inputted to the comparator 16. The torque command voltage S14 is inputted to the voltage/current converter 14 to convert the torque command voltage into current, and the output of the voltage/current converter 14 is connected to the drain of the current detecting reference transistor 13 and the input S16 of the comparator 16. The output S15 of the comparator 16 is inputted to the PWM signal generation circuit 3, and one output S13 of the PWM signal generation circuit 3 is connected to the gate of the current detecting transistor 9 and the gate of the current detecting reference transistor 13. The other output S5 of the PWM signal generation circuit 3 is inputted to the synthesizing circuit 2 shown in FIG. 1. The voltage of the torque command S14 is converted into current by the voltage/current converter 14, the current I14 flows to the current detecting reference transistor 13, and a given voltage S16 is generated. The current detecting transistor 9 and the current detecting reference transistor 13 are equal in channel length and a ratio of the channel widths is W13/W9. Thus, when the motor coil current flowing to the current detecting transistor 9 reaches I14×W9/W13, the drain voltage of the current detecting transistor 9 becomes equal in potential to the drain voltage of the current detecting reference transistor 13, the output of the comparator 16 changes its state, and the current detection signal S15 is inputted to the PWM signal generation circuit 3. One output S13 of the PWM signal generation circuit 3 is inputted to the gate of the current detecting transistor 9 and the gate of the current detecting reference transistor 13 and brings the current detecting transistor 9 and the current detecting reference transistor 13 out of conduction. The other output S5 of the PWM signal generation circuit is inputted to the synthesizing circuit of FIG. 1.

In this way, according to the motor drive of the present embodiment, a current detecting element less susceptible to variations and temperature characteristics can be mounted into an integrated circuit and the current detecting transistor is PWM driven, thereby considerably reducing power consumption during regeneration of the motor coil as compared with the conventional art.

Embodiment 2

Figure 4:
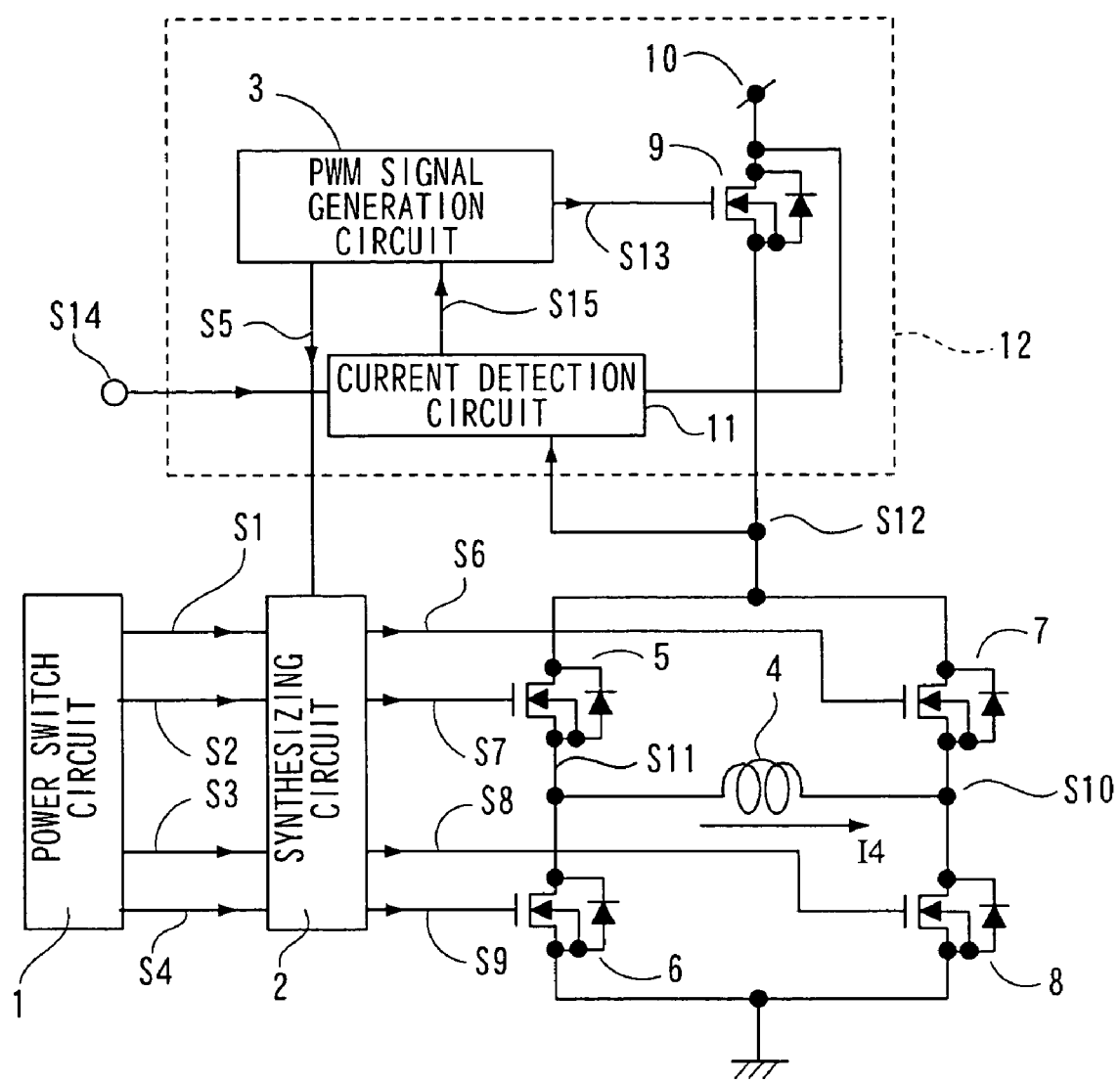
FIG. 4 is a block diagram showing a single-phase motor drive according to (Embodiment 2) of the present invention.
Figure 5:
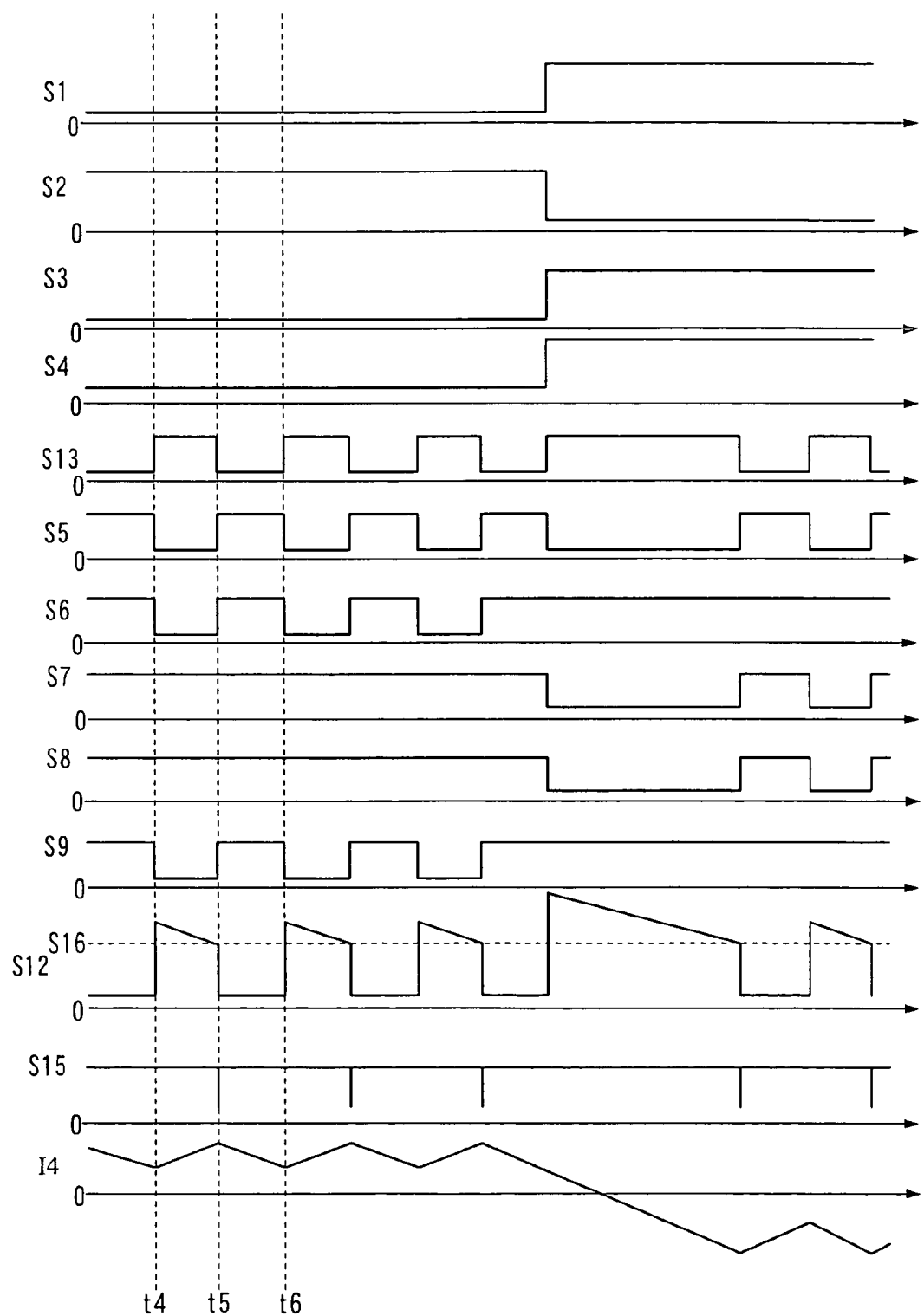
FIG. 5 is a time chart of the embodiment.
Figure 6:
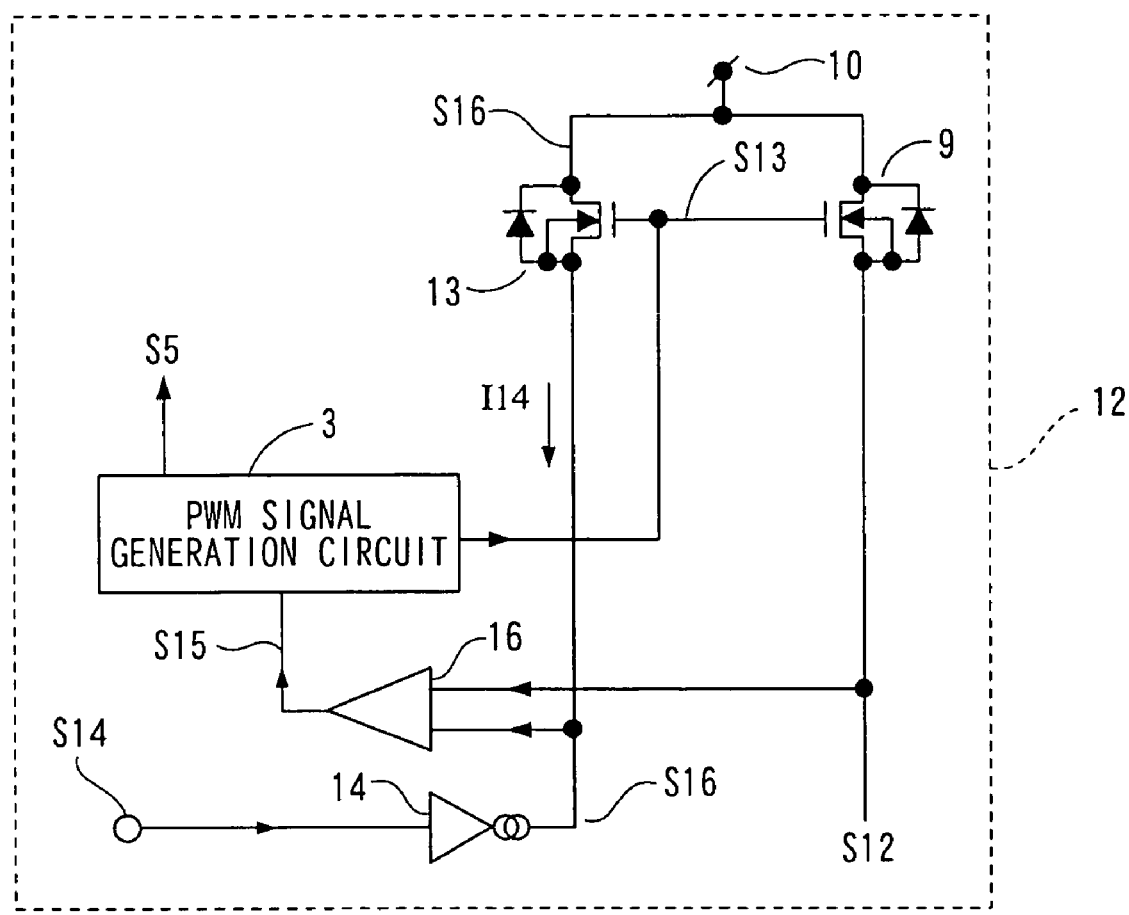
FIG. 6 is a block diagram showing a PWM signal generator, a current detection circuit, and a current detecting transistor of the embodiment.

FIGS. 4 to 6 show (Embodiment 2) of the present invention.

A single-phase motor drive of FIG. 4 comprises upper arm transistors 5 and 7, lower arm transistors 6 and 8, a current detecting transistor 9, a power switch circuit 1, a synthesizing circuit 2, a PWM signal generation circuit 3, a current detection circuit 11, and a motor coil 4. The upper and lower arm transistors 5 to 8 and the current detecting transistor 9 are n-type MOS (metal oxide semiconductor) transistors, each having the source and the drain connected respectively to the anode and the cathode of a diode. The drains of the upper arm transistors 5 and 7 are connected to the source of the current detecting transistor 9 and the sources of the lower arm transistors 6 and 8 are grounded. The drain of the current detecting transistor 9 is connected to a pole 10 of a power supply. The upper and lower arm transistors 5 to 8 and the current detecting transistor 9 act as switching elements.

The source of the upper arm transistor 5, the drain of the lower arm transistor 6, and one end of the motor coil 4 are connected to one another, and the source of the upper arm transistor 7, the drain of the lower arm transistor 8, and the other end of the motor coil 4 are connected to one another. The power switch circuit 1 outputs S1 to S4, which are inputted to the synthesizing circuit 2. A source voltage S12 of the current detecting transistor 9 and a torque command voltage S14 are inputted to the current detection circuit 11. When motor driving current flows to the current detecting transistor 9 and a voltage corresponding to the torque command voltage S14 is generated on the source of the current detecting transistor 9, an output S15 of the current detection circuit 11 changes its state. The output S15 of the current detection circuit 11 is inputted to the PWM signal generation circuit 3. One output of the PWM signal generation circuit 3 generates a switching control signal S13 for specifying a period during which the current detecting transistor 9 is made conducting, and the other output S5 of the PWM signal generation circuit 3 is inputted to the synthesizing circuit 2 and is synthesized therein with the outputs S1 to S4 of the power switch circuit 1. The synthesizing circuit 2 outputs switching control signals S6 to S9 for specifying a period during which the upper and lower arm transistors 5 to 8 are made conducting.

FIG. 5 is a time chart of output signals and motor currents driven by the motor drive shown in FIG. 4. FIG. 4 shows the output signals S1 to S4 of the power switch circuit 1, signals S6 to S9 which are the output signals of the synthesizing circuit 2 and the gate input signals of the upper arm transistors and the lower arm transistors, the voltage S12 generated on the source of the current detecting transistor 9, the torque command voltage S14, the output signal S15 of the current detection circuit 11, the output S5 of the PWM signal generation circuit 3, and a current I4 applied to the motor coil 4. In FIG. 4, the outputs S1 to S4 of the power switch circuit 1 output the signals S6 to S9 for bringing the upper arm transistor 5 and the lower arm transistor 8 into conduction and the signals S6 to S9 are inputted to the synthesizing circuit 2. In this state, one output S5 is first outputted from the PWM signal generation circuit 3 at given moment t7 and is inputted to the synthesizing circuit 2, the signals S6 to S9 are outputted from the synthesizing circuit 2, the upper arm transistor 5 and the lower arm transistor 8 are made conducting, and the other output S13 of the PWM signal generation circuit 3 brings the current detecting transistor 9 into conduction. From moment t7, the coil current I4 gradually increases and the voltage S12 generated on the source of the current detecting transistor 9 decreases. When the voltage S12 generated on the source of the current detecting transistor 9 reaches at moment t8 the voltage S14 determined by a torque command signal, the output S15 of the current detection circuit 11 is changed and is inputted to the PWM signal generation circuit 3, one output signal S5 of the PWM signal generation circuit 3 is inputted to the synthesizing circuit 2 to have a regenerative state, and the synthesizing circuit 2 outputs S6 to S9, so that the upper arm transistors 5 and 7 and the lower arm transistors 6 and 8 are made conducting and the other output signal S13 of the PWM signal generation circuit 3 brings the current detecting transistor 9 out of conduction.

At moments t8 and t9, the upper arm transistors 5 and 7 and the lower arm transistors 6 and 8 are conducting, the current detecting transistor 9 is nonconducting, and the current I4 of the coil 4 becomes a regenerative current and gradually decreases. At moment t9, S5 is outputted again from the PWM signal generation circuit 3 with arbitrary timing and inputted to the synthesizing circuit 2, the signals S6 to S9 are outputted from the synthesizing circuit 2, the upper arm transistor 5 and the lower arm transistor 8 are made conducting, the upper arm transistor 7 and the lower arm transistor 6 are made nonconducting, and the other output signal S13 of the PWM signal generation circuit 3 brings the current detecting transistor 9 into conduction, so that the coil current I4 gradually increases again and the voltage S12 generated on the source of the current detecting transistor 9 decreases. By repeating this operation, it is possible to apply the current I4 almost equivalent to the torque command voltage S14 to the motor coil 4.

FIG. 6 shows a block 12 of the PWM signal generation circuit 3, the current detection circuit 11, and the current detecting transistor 9. In FIG. 6, the block 12 comprises the current detecting transistor 9, a current detecting reference transistor 13, a voltage/current converter 14, a comparator 16, and the PWM signal generation circuit 3. The current detecting reference transistor 13 is equal in channel length to the current detecting transistor 9 and is sufficiently small in channel width. When the current detecting transistor 9 has a channel width of W9 and the current detecting reference transistor 13 has a channel width of W13, a ratio of W13/W9 is obtained. The gate and drain of the current detecting transistor 9 are connected respectively to the gate and drain of the current detecting reference transistor 13, and the source S12 of the current detecting transistor 9 and a source S16 of the current detecting reference transistor 13 are inputted to the comparator 16. The torque command voltage S14 is inputted to the voltage/current converter 14 to convert the torque command voltage into current, and the output of the voltage/current converter 14 is connected to the source of the current detecting reference transistor 13 and the input S16 of the comparator 16. The output S15 of the comparator 16 is inputted to the PWM signal generation circuit 3, and one output S13 of the PWM signal generation circuit 3 is connected to the gate of the current detecting transistor 9 and the gate of the current detecting reference transistor 13. The other output S5 of the PWM signal generation circuit 3 is inputted to the synthesizing circuit 2 shown in FIG. 4. The voltage of the torque command S14 is converted into current by the voltage/current converter 14, the current I14 flows to the current detecting reference transistor 13, and a given voltage S16 is generated. The current detecting transistor 9 and the current detecting reference transistor 13 are equal in channel length and a ratio of the channel widths is W13/W9. Thus, when the motor coil current flowing to the current detecting transistor 9 reaches I14×W9/W13, the source voltage of the current detecting transistor 9 becomes equal in potential to the source voltage of the current detecting reference transistor 13, the output of the comparator 16 changes its state, and the current detection signal S15 is inputted to the PWM signal generation circuit 3. One output S13 of the PWM signal generation circuit 3 is inputted to the gate of the current detecting transistor 9 and the gate of the current detecting reference transistor 13 and brings the current detecting transistor 9 and the current detecting reference transistor 13 out of conduction. The other output S5 of the PWM signal generation circuit is inputted to the synthesizing circuit of FIG. 1.

In this way, according to the motor drive of the present embodiment, a current detecting element less susceptible to variations and temperature characteristics can be mounted into an integrated circuit and the current detecting transistor is PWM driven, thereby considerably reducing power consumption during regeneration of the motor coil as compared with the conventional art.

Embodiment 3

Figure 7:
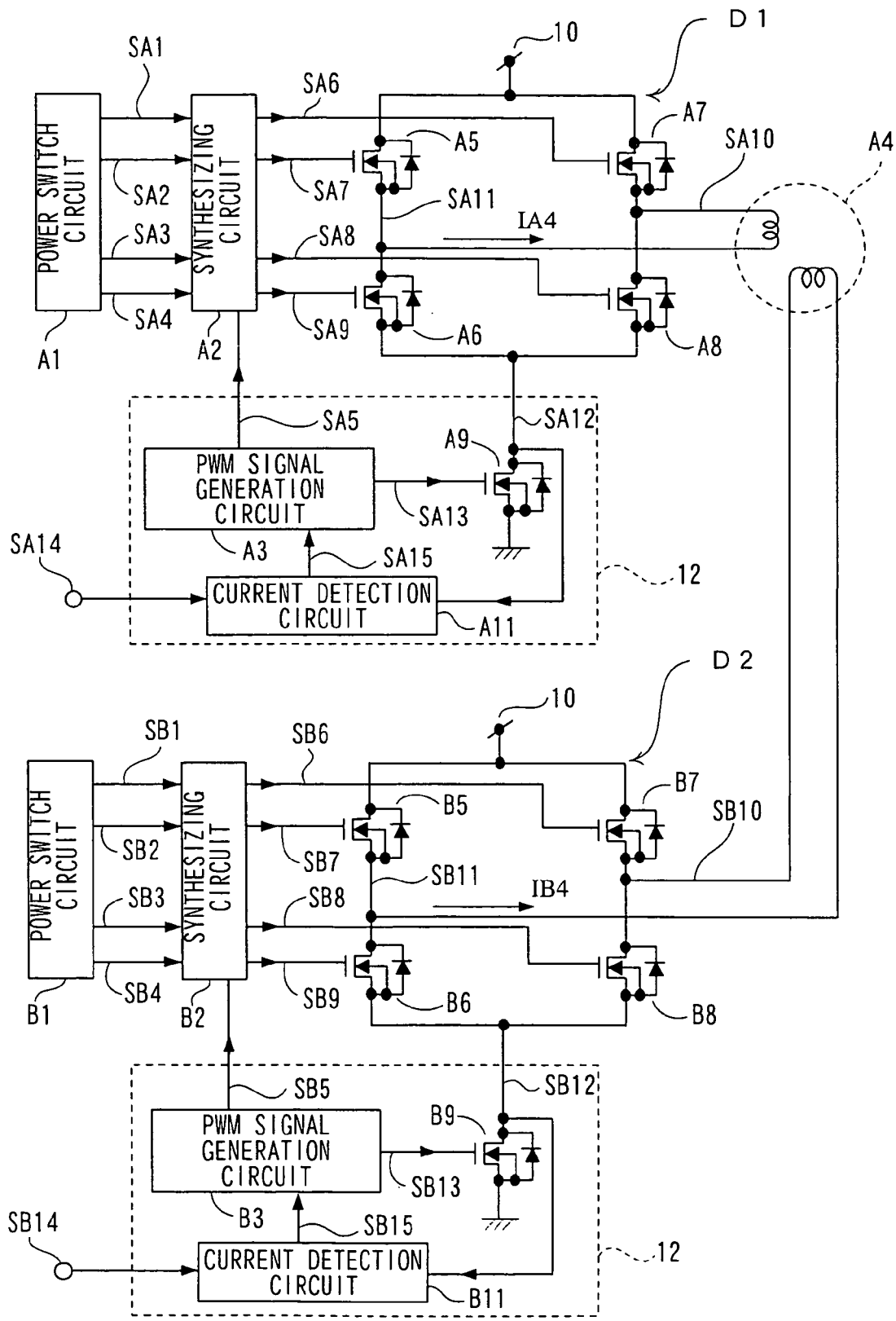
FIG. 7 is a block diagram showing a two-phase stepping motor drive according to (Embodiment 3) of the present invention.

FIG. 7 shows a motor drive obtained by applying (Embodiment 1) of the present invention to a two-phase stepping motor. In the two-phase stepping motor drive, reference numerals A1 and B1 denote power switch circuits, reference numerals A2 and B2 denote synthesizing circuits, reference numerals A3 and B3 denote PWM signal generation circuits, reference numerals A5, A7, B5, and B7 denote upper arm transistors, reference numerals A6, A8, B6, and B8 denote lower arm transistors, reference numerals A9 and B9 denote current detecting transistors, and reference numerals A11 and B11 denote current detection circuits. The motor drive is constituted of a drive D1 for driving a first phase of the motor coil A4 and a drive D2 for driving a second phase of the motor coil A4. The drives are similar in configuration to (Embodiment 1).

Embodiment 4

Figure 8:
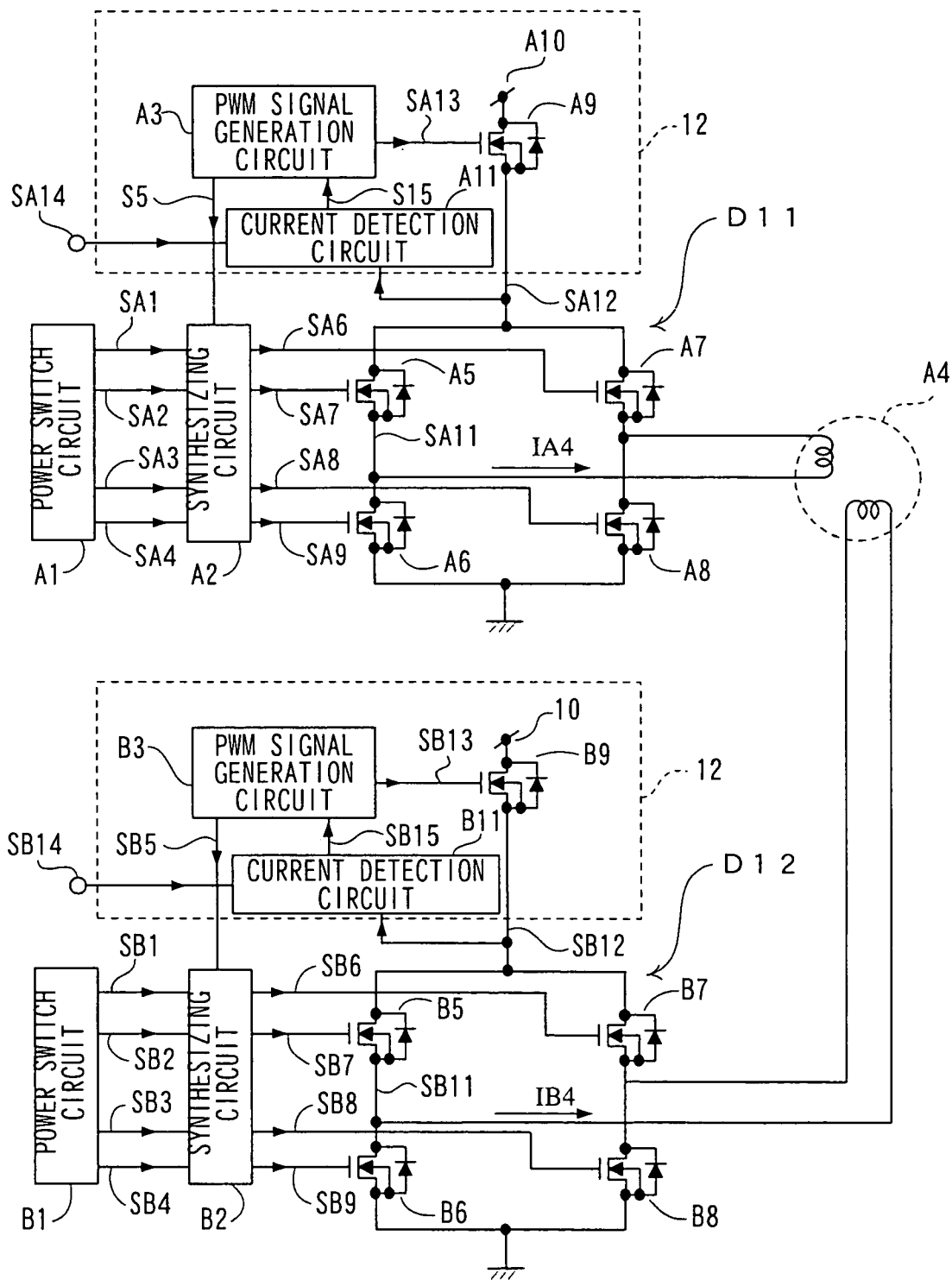
FIG. 8 is a block diagram showing a two-phase stepping motor drive according to (Embodiment 4) of the present invention.

FIG. 8 shows s a motor drive obtained by applying (Embodiment 2) of the present invention to a two-phase stepping motor. The two-phase stepping motor drive is constituted of a drive D11 for driving a first phase of a motor coil A4 and a drive D12 for driving a second phase of the motor coil A4. The drives are similar in configuration to (Embodiment 2).

Embodiment 5

Figure 9:
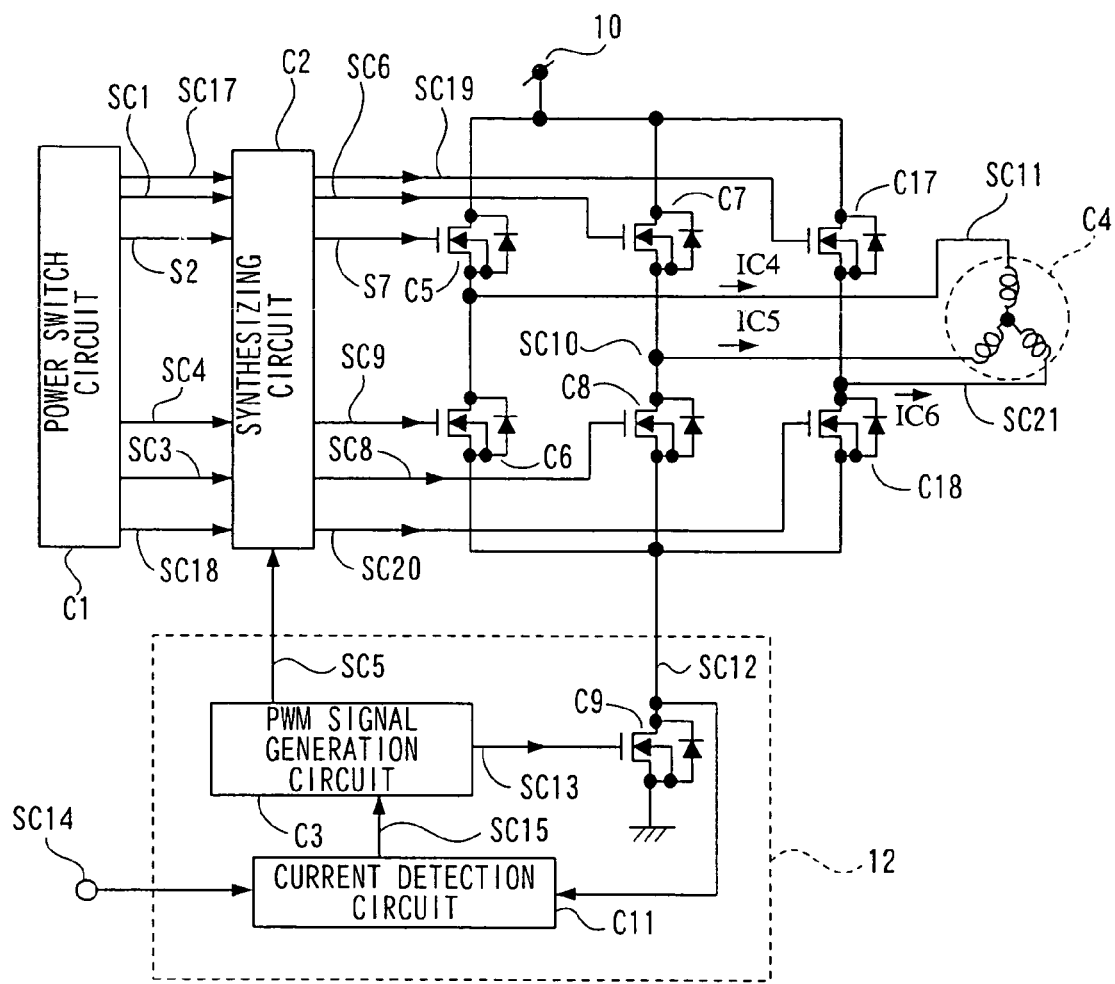
FIG. 9 is a block diagram showing a three-phase motor drive according to (Embodiment 5) of the present invention.
Figure 10:
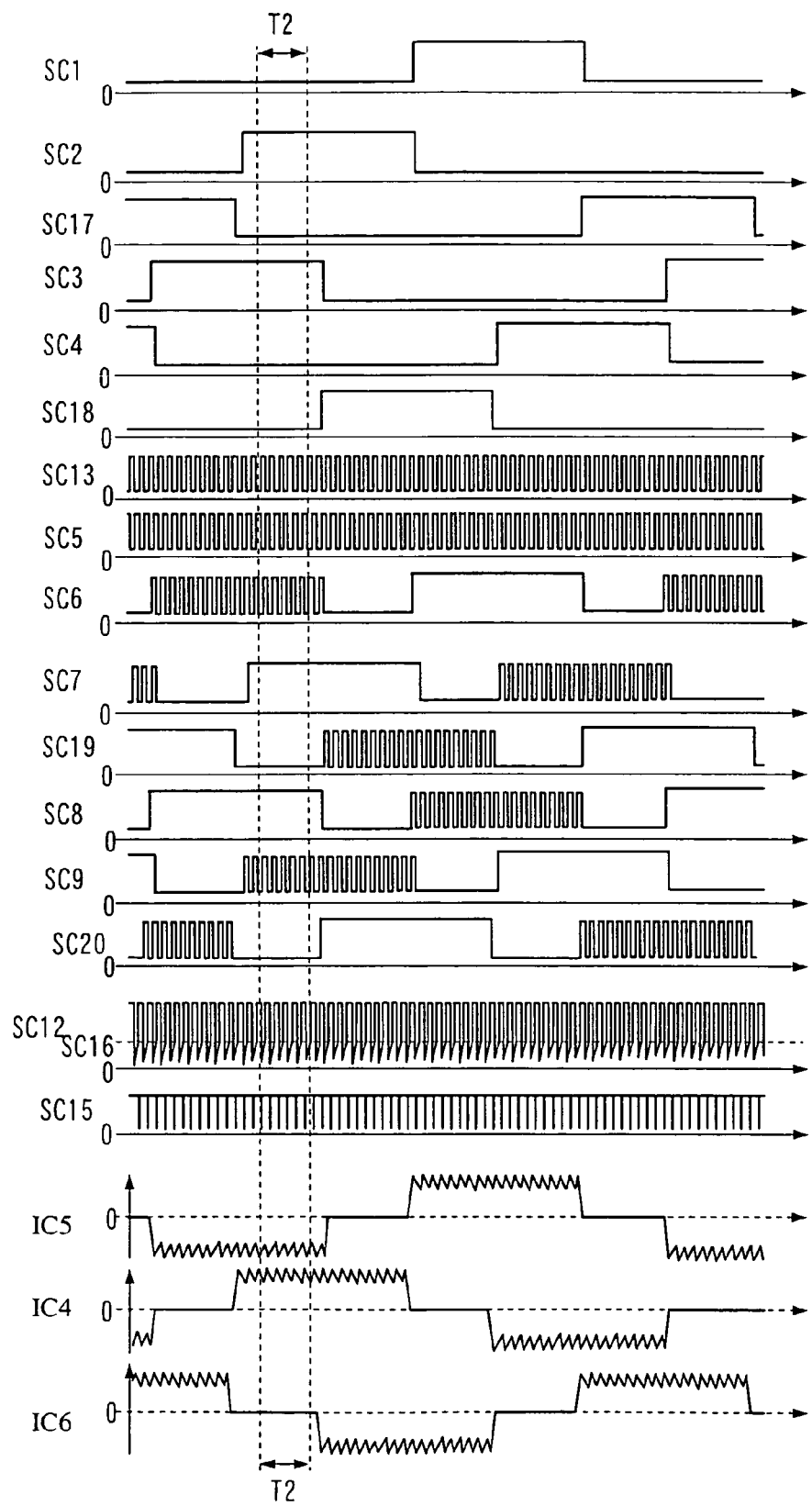
FIG. 10 is a time chart of the embodiment.
Figure 11:
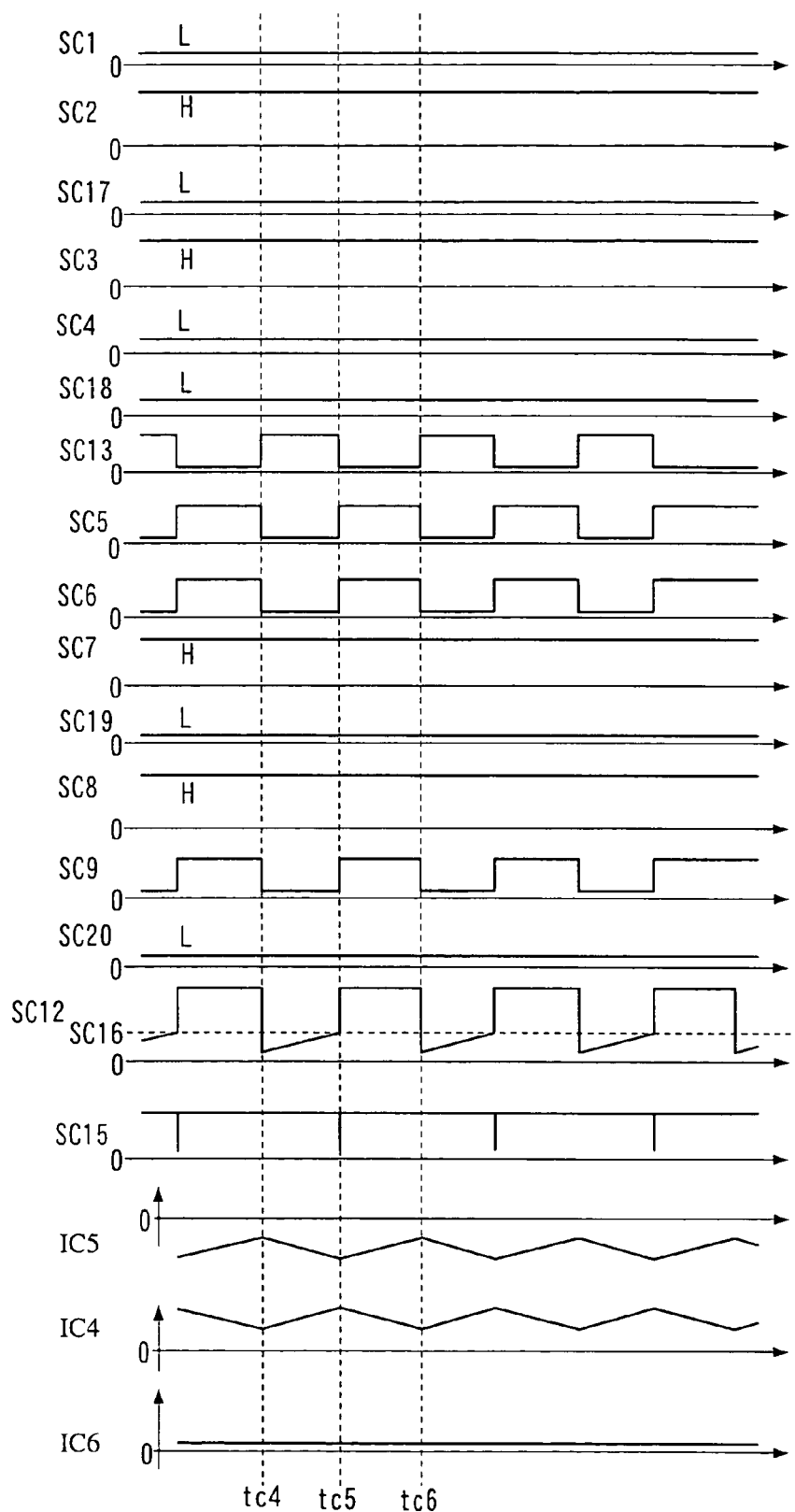
FIG. 11 is an enlarged view showing coil currents and signals of the three-phase motor drive in period T2 of FIG. 10.

FIGS. 9 to 11 show (Embodiment 5) of the present invention.

FIG. 9 shows a motor drive obtained by applying (Embodiment 1) of the present invention to a three-phase motor. The three-phase motor drive comprises upper arm transistors C5, C7, and C17, lower arm transistors C6, C8, and C18, a current detecting transistor C9, a power switch circuit C1, a synthesizing circuit C2, a PWM signal generation circuit C3, a current detection circuit C11, and a motor coil C4. The upper and lower arm transistors C5 to C8, C17, and C19 and the current detecting transistor C9 are n-type MOS (metal oxide semiconductor) transistors, each having the source and the drain connected respectively to the anode and the cathode of a diode. The drains of the upper arm transistors C5, C7, and C17 are connected to a pole 10 of a power supply and the sources of the lower arm transistors C6, C8, and C18 are connected to the drain of the current detecting transistor C9. The source of the current detecting transistor C9 is grounded. The upper and lower arm transistors C5 to C8, C17, and C18 and the current detecting transistor C9 act as switching elements.

The source of the upper arm transistor C5, the drain of the lower arm transistor C6, and one end of the motor coil C4 are connected to one another. The source of the upper arm transistor C7, the drain of the lower arm transistor C8, and one end of the motor coil C4 are connected to one another. The source of the upper arm transistor C17, the drain of the lower arm transistor C18, and the other end of the motor coil C4 are connected to one another. The power switch circuit C1 outputs SC1 to SC4, SC17, and SC18, which are inputted to the synthesizing circuit C2. A drain voltage SC12 of the current detecting transistor C9 and a torque command voltage SC14 are inputted to the current detection circuit C11. When motor driving current flows to the current detecting transistor C9 and a voltage corresponding to the torque command voltage SC14 is generated on the drain of the current detecting transistor C9, an output SC15 of the current detection circuit C11 changes its state. The output SC15 of the current detection circuit C11 is inputted to the PWM signal generation circuit C3. One output of the PWM signal generation circuit C3 generates a switching control signal SC13 for specifying a period during which the current detecting transistor C9 is made conducting, and the other output SC5 of the PWM signal generation circuit C3 is inputted to the synthesizing circuit C2 and is synthesized therein with the outputs SC1 to SC4, SC17, and SC18 of the power switch circuit C1. The synthesizing circuit C2 outputs switching control signals SC6 to SC9, SC19, and SC20 for specifying a period during which the upper and lower arm transistors C5 to C8, C17, and C18 are made conducting.

FIGS. 10 and 11 are time charts of output signals and motor currents driven by the three-phase motor drive shown in FIG. 9. FIG. 10 is an overall diagram and FIG. 11 is an enlarged view showing period T2 of FIG. 10. FIGS. 10 and 11 show the output signals SC1 to SC4, SC17, and SC18 of the power switch circuit C1, the signals SC6 to SC9, SC19, and SC20 which are the output signals of the synthesizing circuit C2 and the gate input signals of the upper arm transistors and the lower arm transistors, the voltage SC12 generated on the drain of the current detecting transistor C9, the torque command voltage SC14, the output signal SC15 of the current detection circuit C1, the output SC5 of the PWM signal generation circuit C3, and currents IC4 to IC6 applied to the motor coil C4. In FIG. 9, the outputs SC1 to SC4, SC17, and SC18 of the power switch circuit C1 output the signals SC6 to SC9, SC19, and SC20 for bringing the upper arm transistor C5 and the lower arm transistor C8 into conduction and the signals are inputted to the synthesizing circuit C2. In this state, one output SC5 is outputted from the PWM signal generation circuit C3 at given moment tc4 and is inputted to the synthesizing circuit C2, the signals SC6 to SC9, SC19, and SC20 are outputted from the synthesizing circuit C2, the upper arm transistor C5 and the lower arm transistor C8 are made conducting, and the other output SC13 of the PWM signal generation circuit C3 brings the current detecting transistor C9 into conduction. From moment tc4, the coil currents IC4 and IC5 gradually increase and the voltage SC12 generated on the drain of the current detecting transistor C9 also increases. When the voltage SC12 generated on the drain of the current detecting transistor C9 reaches at moment tc5 the voltage SC14 determined by a torque command signal, the output SC15 of the current detection circuit C11 is changed and is inputted to the PWM signal generation circuit C3, one output signal SC5 of the PWM signal generation circuit C3 is inputted to the synthesizing circuit C2 to have a regenerative state, and the synthesizing circuit C2 outputs SC6 to SC9, SC19, and SC20, so that the upper arm transistors C5 and C7 and the lower arm transistors C6 and C8 are made conducting and the other output signal SC13 of the PWM signal generation circuit C3 brings the current detecting transistor C9 out of conduction.

At moments tc5 and tc6, the upper arm transistors C5 and C7 and the lower arm transistors C6 and C8 are conducting, the current detecting transistor C9 is nonconducting, and the currents IC4 and IC5 of the coil C4 become regenerative currents and gradually decrease. At moment tc6, SC5 is outputted again from the PWM signal generation circuit with arbitrary timing and is inputted to the synthesizing circuit C2, the signals SC6 to SC9, SC19, and SC20 are outputted from the synthesizing circuit C2, the upper arm transistor C5 and the lower arm transistor C8 are made conducting, the upper arm transistor C7 and the lower arm transistor C6 are made nonconducting, and the other output signal SC13 of the PWM signal generation circuit. C3 brings the current detecting transistor C9 into conduction, so that the coil currents IC4 and IC5 gradually increase again and the voltage SC12 generated on the drain of the current detecting transistor C9 also increases. By repeating this operation, it is possible to apply the currents IC4 and IC5 almost equivalent to the torque command voltage SC14 to the motor coil C4. In FIG. 10, the operation of FIG. 11 is performed in an energized state determined by the outputs of SC1 to SC4, SC17, and SC18 of the power switch circuit.

In this way, according to the motor drive of the present embodiment, a current detecting element less susceptible to variations and temperature characteristics can be mounted into an integrated circuit and the current detecting transistor is PWM driven, thereby considerably reducing power consumption during regeneration of the motor coil as compared with the conventional art.

Embodiment 6

Figure 13:
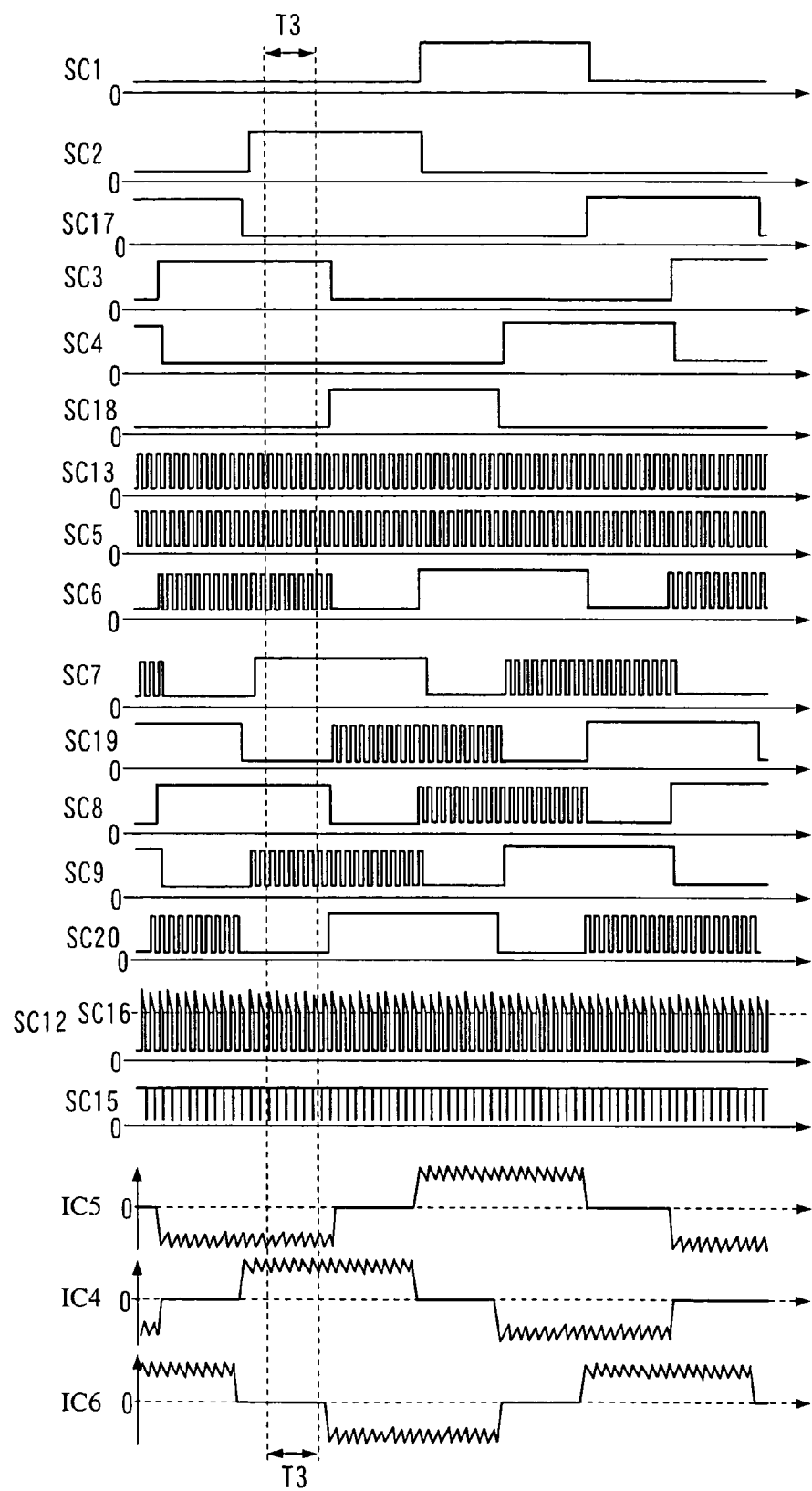
FIG. 13 is a time chart of the embodiment.
Figure 14:
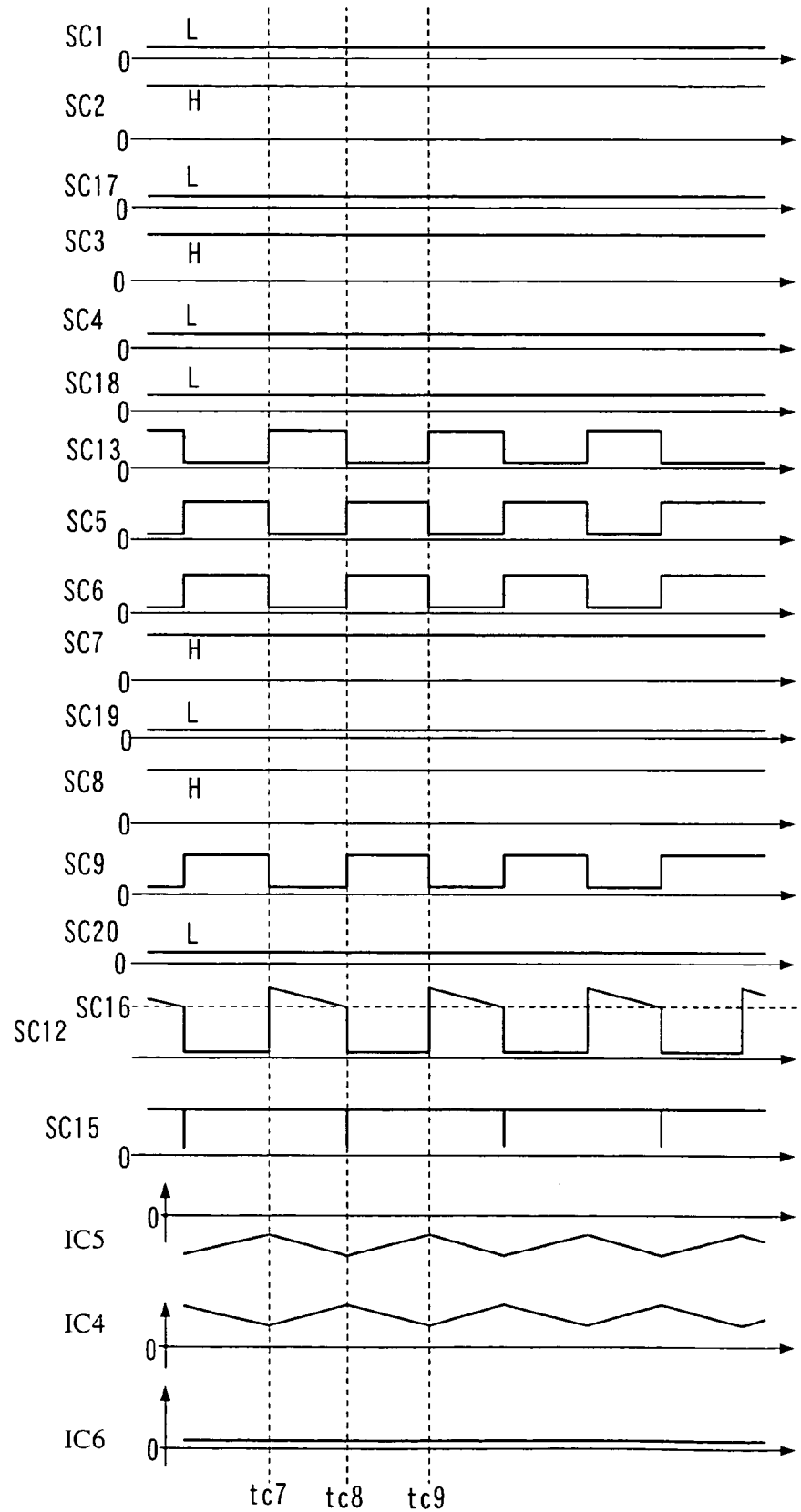
FIG. 14 is an enlarged view showing coil currents and signals of the three-phase motor drive in period T3 of FIG. 13.
Figure 15:
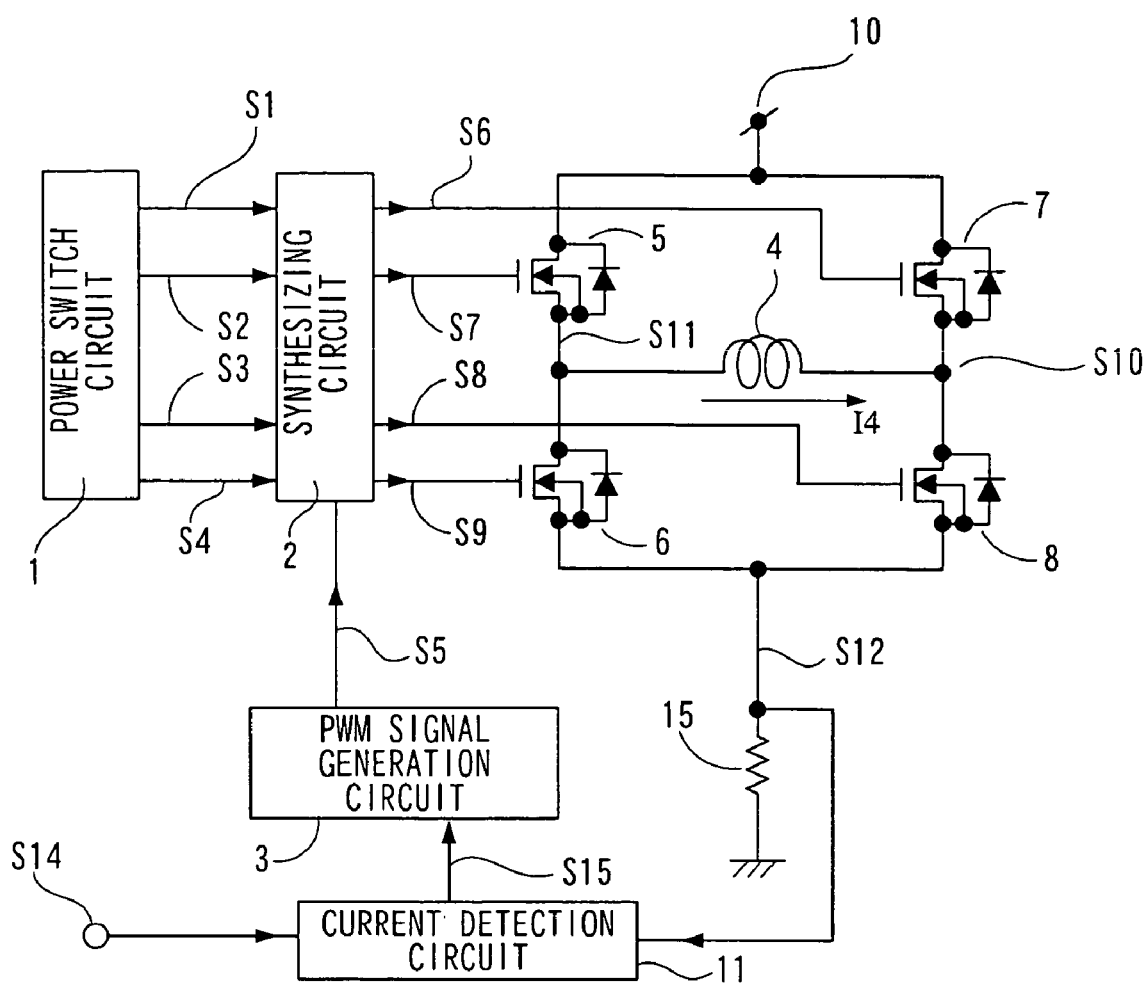
FIG. 15 is a block diagram showing a conventional single-phase motor drive.
Figure 16:
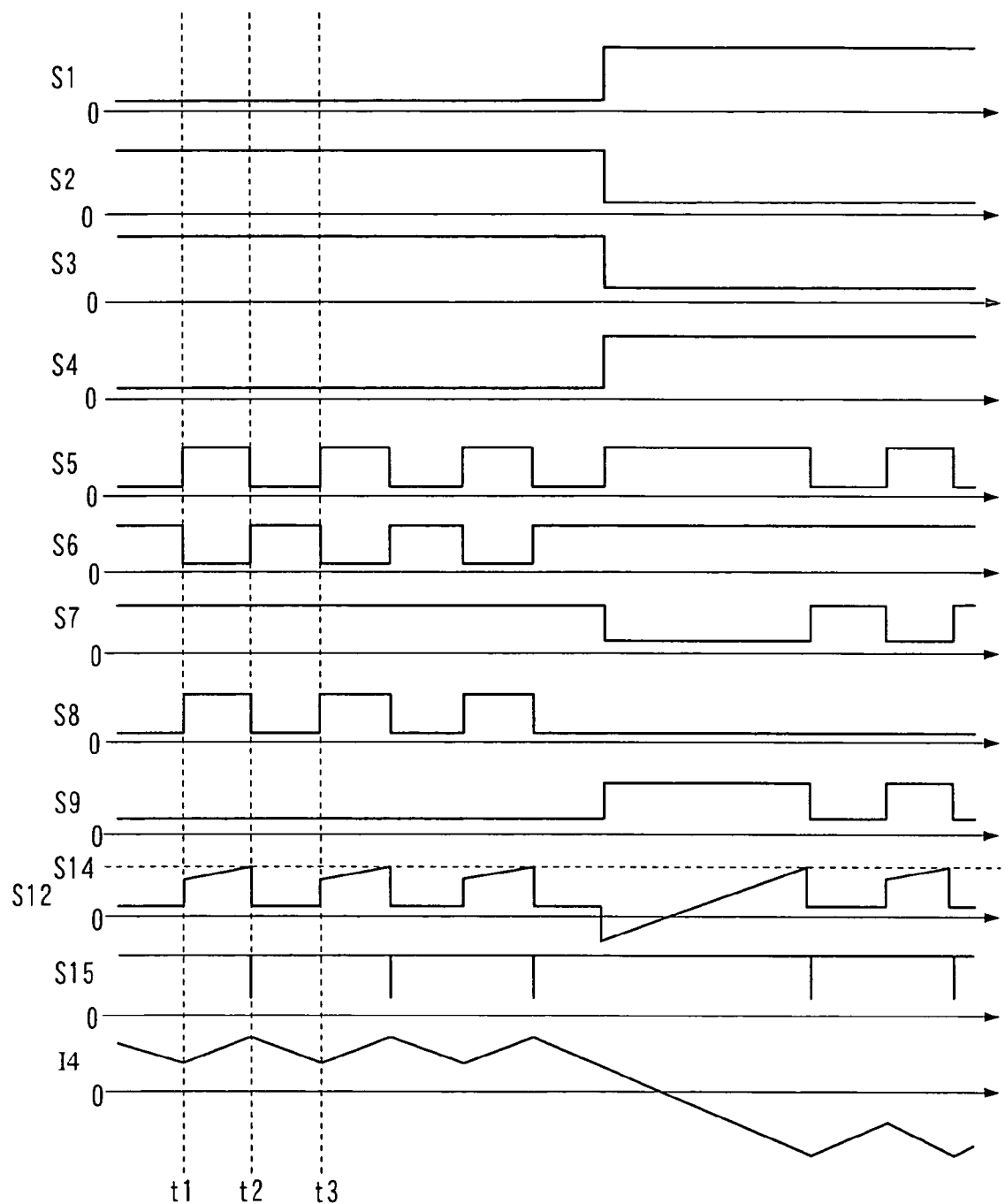
FIG. 16 is a time chart of the conventional art.
Figure 17:
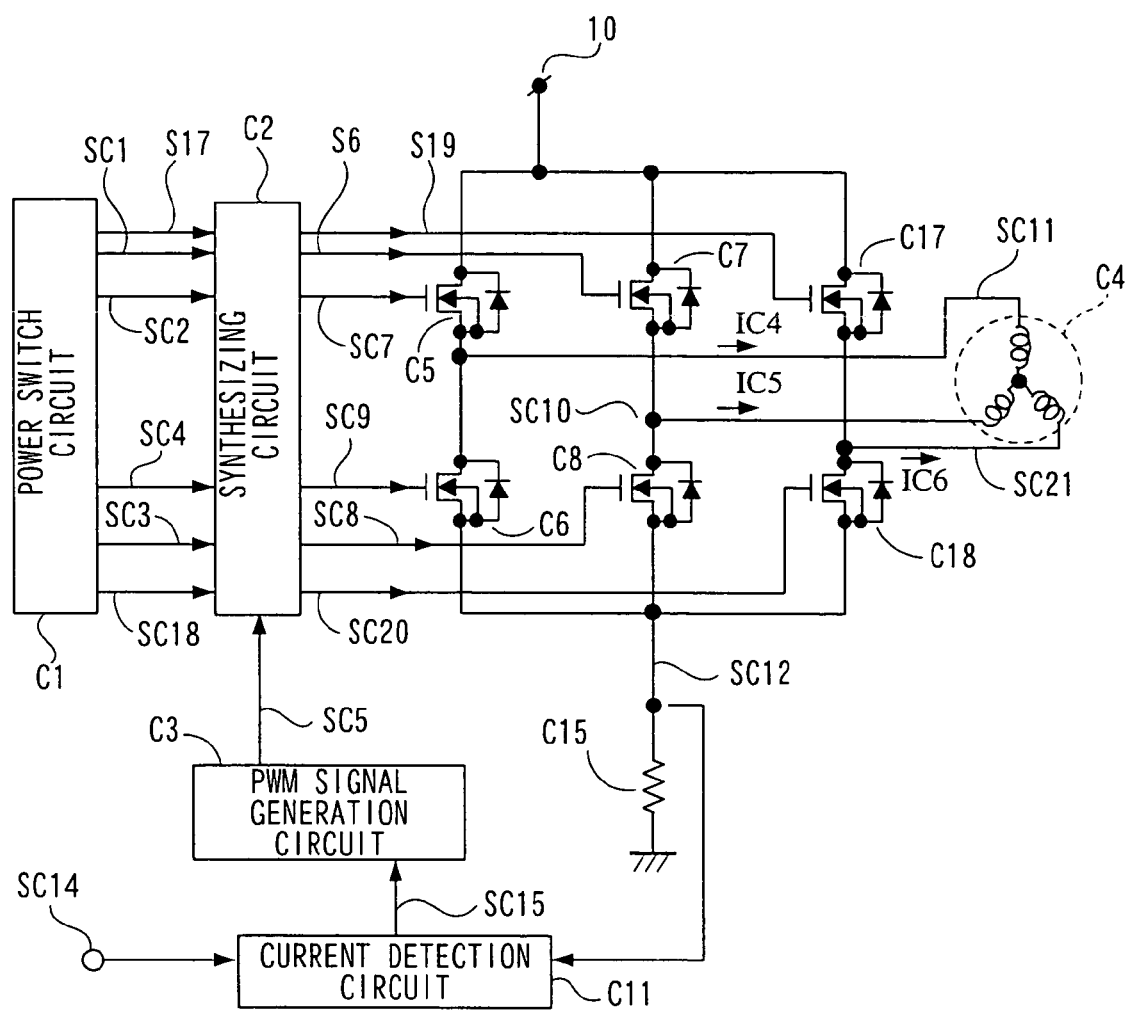
FIG. 17 is a block diagram showing a three-phase motor drive proposed in the conventional art.
Figure 18:
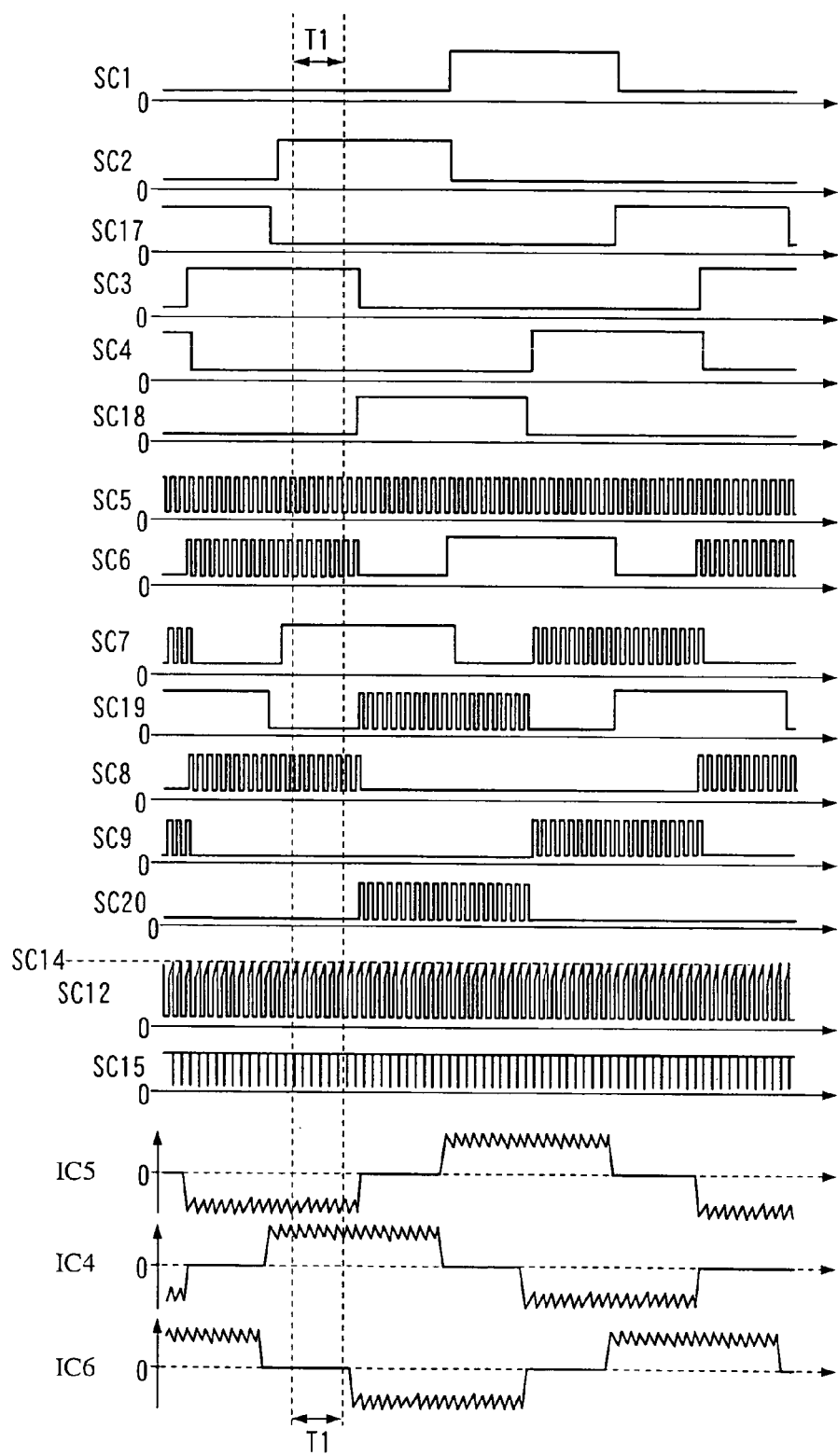
FIG. 18 is a timing chart of FIG. 17.
Figure 19:
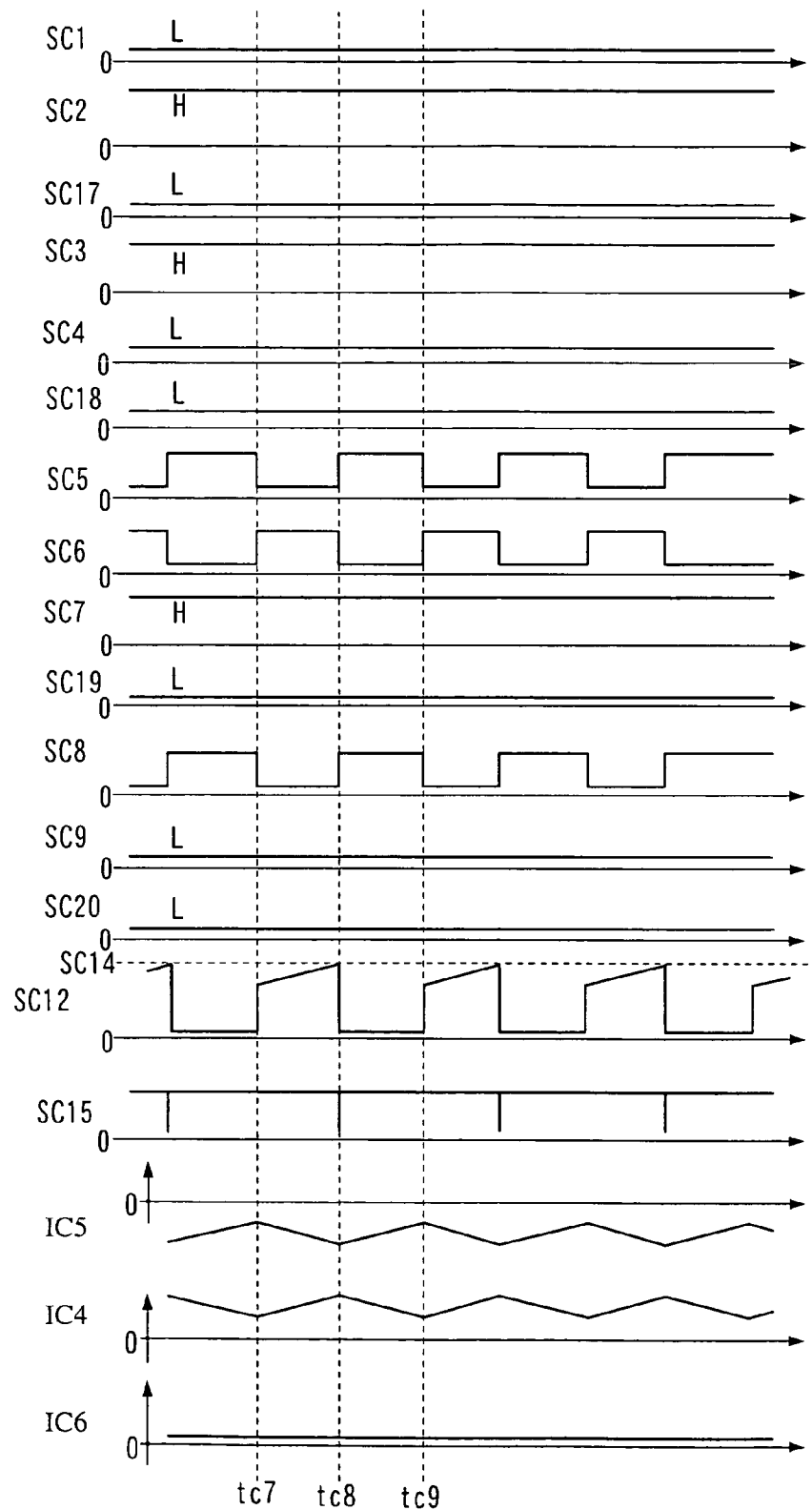
FIG. 19 is an enlarged view showing signals in period T1 of FIG. 18.

FIGS. 12 to 14 show (Embodiment 6) of the present invention.

FIG. 12 shows a motor drive obtained by applying (Embodiment 2) of the present invention to a three-phase motor drive. The three-phase motor drive comprises upper arm transistors C5, C7, and C17, lower arm transistors C6, C8, and C18, a current detecting transistor C9, a power switch circuit C1, a synthesizing circuit C2, a PWM signal generation circuit C3, a current detection circuit C11, and a motor coil C4. The upper and lower arm transistors C5 to C8, C17, C18 and the current detecting transistor C9 are n-type MOS (metal oxide semiconductor) transistors, each having the source and the drain connected respectively to the anode and the cathode of a diode. The drains of the upper arm transistors C5, C7, and C17 are connected to the source of the current detecting transistor C9 and the sources of the lower arm transistors C6, C8, and C18 are grounded. The drain of the current detecting transistor C9 is connected to a pole 10 of a power supply. The upper and lower arm transistors C5 to C8, C17, and C18 and the current detecting transistor C9 act as switching elements.

The source of the upper arm transistor C5, the drain of the lower arm transistor C6, and one end of the motor coil C4 are connected to one another. The source of the upper arm transistor C7, the drain of the lower arm transistor C8, and the other end of the motor coil C4 are connected to one another. The source of the upper arm transistor C17, the drain of the lower arm transistor C18, and the other end of the motor coil C4 are connected to one another. The power switch circuit C1 outputs SC1 to SC4, SC17, and SC18, which are inputted to the synthesizing circuit C2. A source voltage SC12 of the current detecting transistor C9 and a torque command voltage SC14 are inputted to the current detection circuit C11. When motor driving current flows to the current detecting transistor C9 and a voltage corresponding to the torque command voltage SC14 is generated on the source of the current detecting transistor C9, an output SC15 of the current detection circuit C11 change sits state. The output SC15 of the current detection circuit C11 is inputted to the PWM signal generation circuit C3. One output of the PWM signal generation circuit C3 generates a switching control signal SC13 for specifying a period during which the current detecting transistor C9 is made conducting, and the other output SC5 of the PWM signal generation circuit C3 is inputted to the synthesizing circuit C2 and is synthesized therein with the outputs SC1 to SC4, SC17, and SC18 of the power switch circuit C1. The synthesizing circuit C2 outputs switching control signals SC6 to SC9, SC19, and SC20 for specifying a period during which the upper and lower arm transistors C5 to C8, C17, and C18 are made conducting.

FIGS. 13 and 14 are time charts of output signals and motor currents driven by the motor drive shown in FIG. 12. FIGS. 13 and 14 show the output signals SC1 to SC4, SC17, and SC18 of the power switch circuit C1, signals SC6 to SC9, SC19, SC20 which are the output signals of the synthesizing circuit C2 and the gate input signals of the upper arm transistors and the lower arm transistors, the voltage SC12 generated on the source of the current detecting transistor C9, the torque command voltage SC14, the output signal SC15 of the current detection circuit C1, an output signal SC5 of the PWM signal generation circuit C3, and currents IC4 to IC6 applied to the motor coil C4. In FIGS. 13 and 14, the outputs SC1 to SC4, SC17, and SC18 of the power switch circuit C1 output the signals SC6 to SC9, SC19, and SC20 for bringing the upper arm transistor C5 and the lower arm transistor C8 into conduction and the signals are inputted to the synthesizing circuit C2. In this state, one output SC5 is first outputted from the PWM signal generation circuit C3 at given moment tc7 and is inputted to the synthesizing circuit C2, the signals SC6 to SC9, SC19, and SC20 are outputted from the synthesizing circuit C2, the upper arm transistor C5 and the lower arm transistor C8 are made conducting, and the other output SC13 of the PWM signal generation circuit C3 brings the current detecting transistor C9 into conduction. From moment tc7, the coil currents IC4 and IC5 gradually increase and the voltage SC12 generated on the source of the current detecting transistor C9 decreases. When the voltage SC12 generated on the source of the current detecting transistor C9 reaches at moment tc8 the voltage SC14 determined by a torque command signal, the output SC15 of the current detection circuit C11 is changed and is inputted to the PWM signal generation circuit C3, one output signal SC5 of the PWM signal generation circuit C3 is inputted to the synthesizing circuit C2 to have a regenerative state, and the synthesizing circuit C2 outputs SC6 to SC9, so that the upper arm transistors C5 and C7 and the lower arm transistors C6 and C8 are made conducting and the other output signal SC13 of the PWM signal generation circuit C3 brings the current detecting transistor C9 out of conduction.

At moments tc8 and tc9, the upper arm transistors C5 and C7 and the lower arm transistors C6 and C8 are conducting, the current detecting transistor C9 is nonconducting, and the currents IC4 and IC5 of the coil C4 become regenerative currents and gradually decrease. At moment tc9, SC5 is outputted again from the PWM signal generation circuit C3 with arbitrary timing and is inputted to the synthesizing circuit 2, the signals SC6 to SC9, SC19, and SC20 are outputted from the synthesizing circuit C2, the upper arm transistor C5 and the lower arm transistor C8 are made conducting, the upper arm transistor C7 and the lower arm transistor C6 are made nonconducting, and the other output signal SC13 of the PWM signal generation circuit C3 brings the current detecting transistor C9 into conduction, so that the coil current IC4 gradually increases again and the voltage SC12 generated on the source of the current detecting transistor C9 decreases. By repeating this operation, it is possible to apply the currents IC4 and IC5 almost equivalent to the torque command voltage SC14 to the motor coil C4.

In FIG. 10, the operation of FIG. 11 is performed in an energized state determined by the outputs of SC1 to SC4, SC17, and SC18 of the power switch circuit.

In this way, according to the motor drive of the present embodiment, a current detecting element less susceptible to variations and temperature characteristics can be mounted into an integrated circuit and the current detecting transistor is PWM driven, thereby considerably reducing power consumption during regeneration of the motor coil as compared with the conventional art. Hence, various motors can be used for forming an integrated circuit of a motor drive driven by a PWM signal.

What is claimed is:

1. A motor drive, in which a power supply voltage is applied across an output circuit having switching elements making a bridge connection, a motor coil is connected on a midpoint of the output circuit, and an energizing polarity to the motor coil is switched by turning on/off a pair of the switching elements on opposite sides of the bridge connection, the motor drive comprising:
a current detecting switching element connected in series with the output circuit,
a current detection circuit for detecting, in response to a torque command signal, a current applied to the current detecting switching element,
a PWM signal generation circuit for generating a PWM signal according to an output signal of the current detection circuit,
a power switch circuit for determining an energization phase to the motor coil, and
a synthesizing circuit for synthesizing an output signal of the PWM signal generation circuit and an output signal of the power switch circuit,
wherein PWM operation of a first state and a second state is repeated to control current supply to the motor coil, the first state enabling current supply to the motor coil when the switching elements making a bridge connection are such that the switching element on one side determined by the power switch circuit is conducting, the switching element on the other side is nonconducting, and the current detecting switching element is conducting, the second state bringing the current detecting switching element out of conduction and bringing into conduction all the switching elements making a bridge connection in the output circuit.

2. The motor drive according to claim 1, wherein the current detection circuit comprises:
  a current detecting reference switching element having a gate and a source connected respectively to a gate and a source of the current detecting switching element,
  a comparator for comparing a drain voltage of the current detecting switching element and a drain voltage of the current detecting reference switching element, and
  a voltage/current converter for converting an inputted torque command signal into current and determining a current inputted to a drain of the current detecting reference switching element,
  the PWM signal generation circuit generating a PWM signal according to an output signal of the comparator.

3. The motor drive according to claim 1, wherein the current detection circuit comprises:
  a current detecting reference switching element having a gate and a drain connected respectively to a gate and a drain of the current detecting switching element,
  a comparator for comparing a source voltage of the current detecting switching element and a source voltage of the current detecting reference switching element, and
  a voltage/current converter for converting an inputted torque command signal into current and determining a current inputted to a source of the current detecting reference switching element,
  the PWM signal generation circuit generating a PWM signal according to an output signal of the comparator.

* * * * *